(12) United States Patent
Kadota

(10) Patent No.: US 9,110,611 B2
(45) Date of Patent: Aug. 18, 2015

(54) NON-TRANSITORY COMPUTER-READABLE MEDIUMS AND IMAGE PROCESSING APPARATUS

(71) Applicant: Masatoshi Kadota, Takahama (JP)

(72) Inventor: Masatoshi Kadota, Takahama (JP)

(73) Assignee: Brother Kogyo Kabushiki Kaisha, Nagoya-shi, Aichi-ken (JP)

(\*) Notice: Subject to any disclaimer, the term of this patent is extended or adjusted under 35 U.S.C. 154(b) by 0 days.

(21) Appl. No.: 14/068,518

(22) Filed: Oct. 31, 2013

(65) Prior Publication Data

US 2014/0118789 A1 May 1, 2014

(30) Foreign Application Priority Data

Oct. 31, 2012 (JP) .................. 2012-240735

(51) Int. Cl.
*G06F 3/12* (2006.01)
*G06F 15/00* (2006.01)
*G06K 1/00* (2006.01)

(52) U.S. Cl.
CPC .............. *G06F 3/121* (2013.01); *G06F 3/1236* (2013.01); *G06F 3/1284* (2013.01)

(58) Field of Classification Search
None
See application file for complete search history.

(56) References Cited

U.S. PATENT DOCUMENTS

| | | | |
|---|---|---|---|
| 5,220,674 A | 6/1993 | Morgan et al. | |
| 7,383,321 B2 * | 6/2008 | Moyer et al. | 709/219 |
| 7,583,400 B2 * | 9/2009 | Yagita | 358/1.15 |
| 7,958,205 B2 * | 6/2011 | Moyer et al. | 709/219 |
| 8,645,500 B2 * | 2/2014 | Moyer et al. | 709/219 |
| 8,687,219 B2 * | 4/2014 | Sato | 358/1.15 |
| 8,760,677 B2 * | 6/2014 | Kanada | 358/1.14 |
| 2003/0037108 A1 | 2/2003 | Peiffer et al. | |
| 2003/0091015 A1 * | 5/2003 | Gassho et al. | 370/338 |
| 2007/0033646 A1 | 2/2007 | Tosey et al. | |
| 2007/0173077 A1 | 7/2007 | Wang | |
| 2007/0253390 A1 * | 11/2007 | Gassho et al. | 370/338 |
| 2010/0268801 A1 * | 10/2010 | Yukimasa | 709/220 |
| 2011/0134465 A1 * | 6/2011 | Gha | 358/1.15 |
| 2011/0188075 A1 * | 8/2011 | Narushima et al. | 358/1.15 |
| 2011/0194146 A1 * | 8/2011 | Sato | 358/1.15 |
| 2011/0302512 A1 | 12/2011 | Ishii | |
| 2012/0016797 A1 | 1/2012 | Smith et al. | |
| 2012/0227102 A1 | 9/2012 | Parla et al. | |
| 2013/0050739 A1 * | 2/2013 | Oshima et al. | 358/1.14 |
| 2014/0104653 A1 * | 4/2014 | Moyer et al. | 358/1.15 |
| 2014/0122733 A1 * | 5/2014 | Kadota | 709/228 |
| 2014/0129674 A1 * | 5/2014 | Matsuda | 709/217 |
| 2014/0160522 A1 * | 6/2014 | Kawasaki | 358/1.15 |

FOREIGN PATENT DOCUMENTS

JP 2011-257945 A 12/2011

OTHER PUBLICATIONS

IPP USB Specification (IPP over USB) Version 1.0 Draft, Apr. 29, 2011 (Source: ftp://ftp.pwg.org/pub/pwg/ipp/whitepaper/draft-ip-pusbspecification-20110510.pdf).

(Continued)

*Primary Examiner* — Satwant Singh
(74) *Attorney, Agent, or Firm* — Banner & Witcoff, Ltd.

(57) ABSTRACT

A process and system for minimizing an image processing apparatus from remaining in a waiting state when communication with a client application has been lost. Various implementations are described in which processing requests are canceled based on losses of communication with the client application.

11 Claims, 17 Drawing Sheets

(56) References Cited

OTHER PUBLICATIONS

Co-pending U.S. Appl. No. 14/010,752, filed Aug. 27, 2013.
Co-pending U.S. Appl. No. 14/068,146, filed Oct. 31, 2013.
Dec. 2, 2014 (EP) Extended Search Report App. 13190932.7.
Nov. 7, 2014 (US)—Non-Final Office Action—U.S. Appl. No. 14/010,752.
Jun. 3, 2015 (US) Non-Final Office Action—U.S. Appl. No. 14/010,752.

* cited by examiner

NON-TRANSITORY COMPUTER-READABLE MEDIUMS AND IMAGE PROCESSING APPARATUS

CROSS-REFERENCE TO RELATED APPLICATION

This application claims priority from Japanese Patent Application No. 2012-240735 filed on Oct. 31, 2012, which is incorporated herein by reference.

BACKGROUND

1. Technical Field

Aspects described herein relate to a technology that relays communication.

2. Description of the Related Art

A technology has been disclosed in which a configuration screen used to choose settings for an image processing apparatus is displayed on a web browser executed by a terminal device, the image processing apparatus having a web server function.

Moreover, Internet Printing Protocol (IPP) is known. IPP is a standard for connecting an image processing apparatus and a terminal device via the Internet and for making the image processing apparatus perform processing on an image through the Internet.

Moreover, a draft of IPP over Universal Serial Bus (USB) is known. "IPP over USB" is a standard for performing communication in accordance with IPP described above in an environment in which an image processing apparatus and a terminal device are connected through a USB interface.

BRIEF SUMMARY

In accordance with "IPP over USB", a communication relay program is executed at a terminal apparatus. A client application such as a web browser transmits, to a communication relay program, a processing request issued to an image processing apparatus, and the communication relay program transmits the processing request received from the client application to the image processing apparatus.

In this case, when communication is lost for some reason while the image processing apparatus is receiving a processing request from the communication relay program, transmission of the processing request issued from the client application to the image processing apparatus is terminated in the middle of communication.

However, the image processing apparatus is unable to recognize that communication between the client application and the communication relay program is lost. Thus, when communication between the client application and the communication relay program is lost in the middle of communication, there is an issue in that the image processing apparatus is in a reception waiting state for a long period of time waiting for the remainder of the processing request.

In this specification, there is disclosed a technology with which, in the case where communication is relayed between an image processing apparatus and a client application, the image processing apparatus may be prevented from remaining in a reception waiting state for a long period of time due to lost communication between the client application and a communication relay program.

DETAILED DESCRIPTION

First Embodiment

A first embodiment will be described with reference to FIGS. 1 to 6.

(1) Image Processing System

Figure 1:
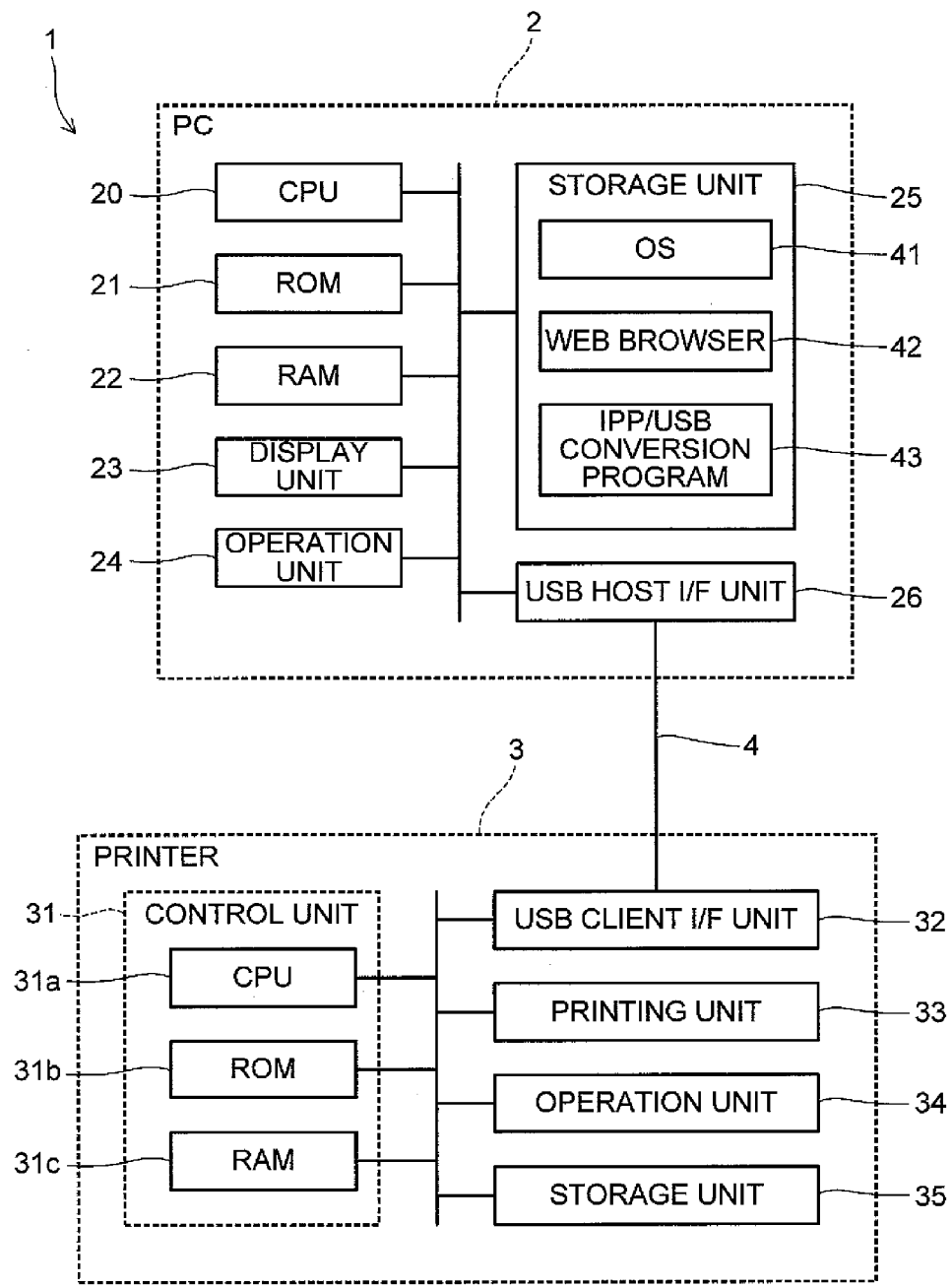
FIG. 1 is a block diagram illustrating an electrical structure of a personal computer (PC) and that of a printer according to the first embodiment.

First, an image processing system 1 according to the first embodiment will be described with reference to FIG. 1. The image processing system 1 includes a PC 2 and a printer 3. The PC 2 and the printer 3 are connected via a USB (Universal Serial Bus) cable 4 in such a manner that the PC 2 is capable of communicating with the printer 3. In addition, the printer 3 is a USB printer class device.

The PC 2 is an example of an information processing apparatus and a communication relay apparatus. The printer 3 is an example of an image processing apparatus. The USB cable 4 is an example of a communication line.

The PC 2 may perform the following two types of communication (a) and (b) with the printer 3 via the USB cable 4:
(a) Communication for choosing settings for the printer 3
(b) Communication for transmitting print data to the printer 3.

Such communication is performed in accordance with the "IPP over USB" specification (Version 1.0 Draft 20 as of Oct. 31, 2012). IPP is Hypertext Transport Protocol (HTTP)-based and is a standard for performing communication with a printer via a Transmission Control Protocol/Internet Protocol (TCP/IP) network such as the Internet or a local-area network (LAN).

"IPP over USB" is a standard for performing IPP communication in an environment in which connection is established through a USB interface. In accordance with "IPP over USB", IPP communication data is packed in USB packets and the USB packets are transmitted or received.

(1-1) Electrical Structure of PC

An Electrical structure of the PC 2 will be described with reference to FIG. 1. The PC 2 includes a central processing unit (CPU) 20, a read-only memory (ROM) 21, a random-access memory (RAM) 22, a display unit 23, an operation unit 24, a storage unit 25, and a USB host interface unit (represented as USB HOST I/F UNIT in FIG. 1) 26.

The CPU 20 controls individual units of the PC 2 by executing programs stored in the ROM 21 or the storage unit 25. In the ROM 21, programs to be executed by the CPU 20, data, and the like are stored. The RAM 22 is used as a main storage device for the CPU 20 to execute various types of processing.

The display unit 23 includes a display device such as a liquid crystal display, a display driving circuit that drives the display device, and the like.

The operation unit 24 includes a keyboard, a mouse, and an interface to which the keyboard and the mouse are connected.

The storage unit 25 is a device in which various programs and data are stored by using a non-volatile memory such as a hard disk drive and/or a flash memory or other memories as known in the art. In the storage unit 25, programs such as an operating system (OS) 41, a web browser 42, and an IPP/USB conversion program 43 are stored. These programs are executed by the CPU 20.

The web browser 42 is an example of a client application that may perform multi-session communication. Moreover, the IPP/USB conversion program 43 is an example of a communication relay program.

The USB host interface unit 26 includes a USB host controller, a jack to which the USB cable 4 is connected, and the like. The USB host interface unit 26 is connected to the printer 3 via the USB cable 4 in such a manner that the USB host interface unit 26 is capable of communicating with the printer 3.

(1-2) Printer

Next, an electrical structure of the printer 3 will be described with reference to FIG. 1. The printer 3 includes a control unit 31, a USB client interface unit (represented as USB CLIENT I/F UNIT in FIG. 1) 32, a printing unit 33, an operation unit 34, and a storage unit 35.

The control unit 31 includes a CPU 31*a*, a ROM 31*b*, a RAM 31*c*, and the like. The CPU 31*a* controls individual units of the printer 3 by executing programs stored in the ROM 31*b* or the storage unit 35. In the ROM 31*b*, programs to be executed by the CPU 31*a*, various data, and the like are stored. The RAM 31*c* is used as a main storage device for the CPU 31*a* to execute various types of processing. The CPU 31*a* is an example of a first processing unit, an example of a second processing unit, an example of a first responding unit, and an example of a second responding unit.

The printing unit 33 is a printing device that prints images on sheets such as print sheets by using an electrophotography method, an ink-jet method, or the like.

The operation unit 34 includes a display device such as a liquid crystal display, various operation buttons, and the like.

The storage unit 35 is a device in which various data are stored by using a non-volatile memory such as a hard disk or a flash memory.

The USB client interface unit 32 includes a jack to which the USB cable 4 is connected, and the like. The USB client interface unit 32 is connected to the PC 2 via the USB cable 4 in such a manner that the USB client interface unit 32 is capable of communicating with the PC 2.

Moreover, in addition to this, the printer 3 has first and second trays in which print sheets are stored.

(2) Program Configuration of PC and Function Units of Printer

Figure 2:
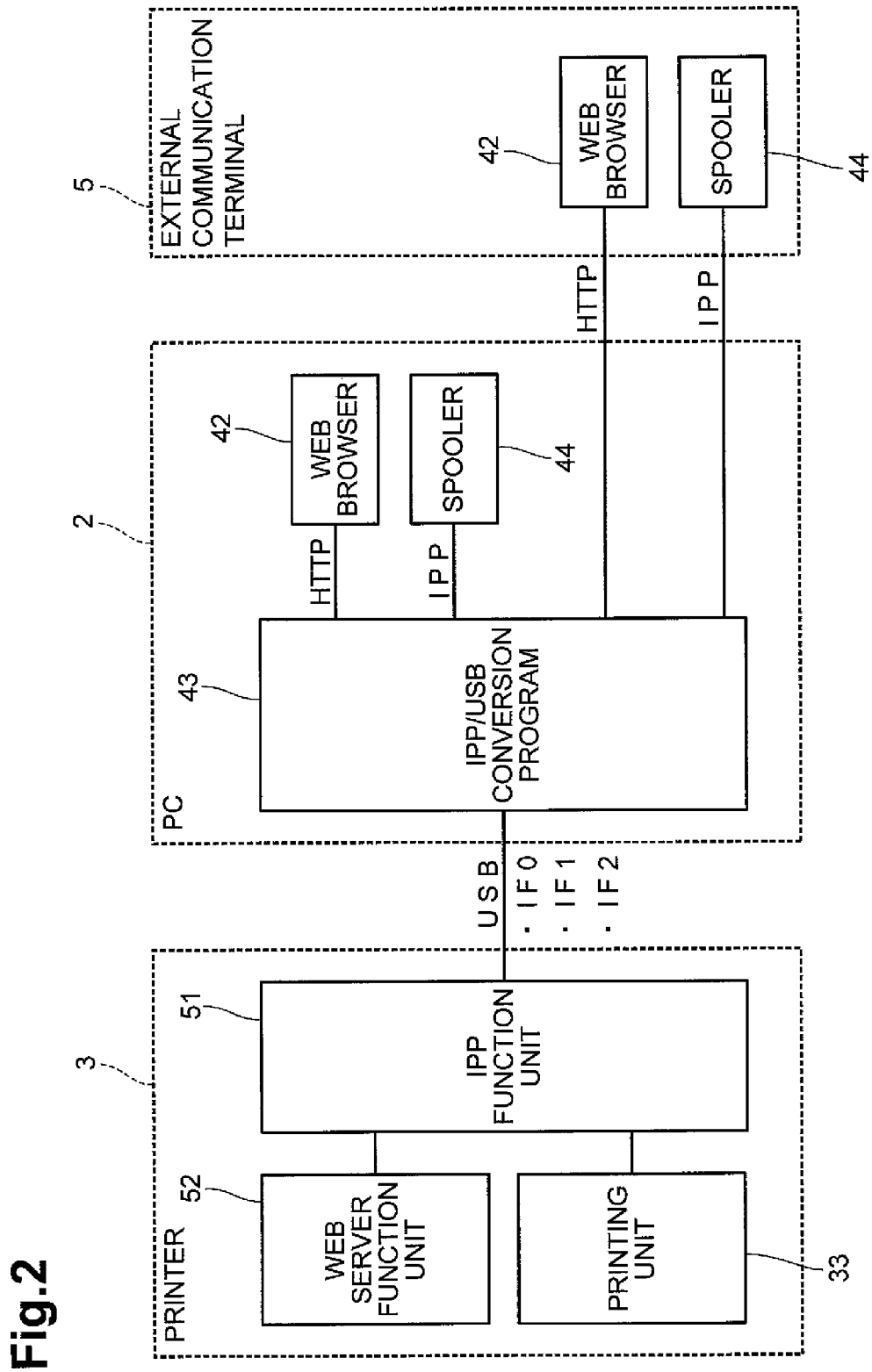
FIG. 2 is a block diagram illustrating a program configuration of the PC and function units of a printer.

Next, a program configuration of the PC 2 for performing communication in accordance with "IPP over USB" and function units of the printer 3 will be described with reference to FIG. 2.

(2-1) Program Configuration of PC

First, the program configuration of the PC 2 will be described. The PC 2 executes the IPP/USB conversion program 43, the web browser 42, and a spooler 44.

The IPP/USB conversion program 43 is a program that relays communication (a) for choosing settings for the printer 3 between the web browser 42 and an IPP function unit 51 of the printer 3 and relays communication (b) for transmitting print data to the printer 3 between the spooler 44 and the IPP function unit 51. IPP function unit 51 is an example of a protocol function unit.

The IPP/USB conversion program 43 is resident as a server program for http://localhost:80. Localhost means an IP address of the PC 2 and is specifically "127.0.0.1", for example. Moreover, "80" represents a port number to be used. Note that the port number "80" may not be mentioned. The IPP/USB conversion program 43 performs communication with the web browser 42 in accordance with HTTP, and performs communication with the spooler 44 in accordance with IPP.

Moreover, the IPP/USB conversion program 43 performs communication with the IPP function unit 51 via the USB cable 4. Details of the IPP/USB conversion program 43 will be described below.

The web browser 42 is a program used as a user interface for choosing settings for the printer 3. A commonly-used web browser may be used as the web browser 42.

In an environment in which the PC 2 and the printer 3 are connected via the USB cable 4, the web browser 42 transmits, to a port 80 of localhost (127.0.0.1), an HTTP request for transmission of screen data of the printer 3 to be displayed on a configuration screen 60 (see FIG. 3), an HTTP request for transmission of an image to be displayed on the configuration screen 60, or the like. These HTTP requests are each an example of a processing request. Hereinafter, HTTP requests are simply referred to as processing requests.

Note that processing requests are not limited to these. For example, an HTTP request such as a PUT command, a POST command, or the like for setting a set value set by a user using the configuration screen 60 in the printer 3 is an example of a processing request, too.

Upon receiving a processing request from the web browser 42, the IPP/USB conversion program 43 transmits the processing request to the IPP function unit 51 via the USB cable 4.

Here, the screen data is written in Hypertext Markup Language (HTML) or in the eXtensible Markup Language (XML). Although its details will be described later, the screen data is generated by a web server function unit 52 of the printer 3 executing a configuration-screen Common Gateway Interface (CGI). Web server function unit 52 is an example of a data server function unit.

The spooler 44 is a program for spooling print data. The spooler 44 is provided as a part of the OS 41. In an environment in which the PC 2 and the printer 3 are connected via the USB cable 4, the spooler 44 transmits print data to the IPP/USB conversion program 43 by performing communication with the IPP/USB conversion program 43 in accordance with IPP.

Upon receiving print data from the spooler 44, the IPP/USB conversion program 43 transmits the print data to the IPP function unit 51 of the printer 3 via the USB cable 4.

Note that the web browser 42 and the spooler 44 may be executed by the PC 2, or may be executed by an external communication terminal 5 connected to the PC 2 in such a manner that the external communication terminal 5 is capable of communicating with the PC 2.

(2-2) Function Units of Printer

Next, function units of the printer 3 will be described. The printer 3 includes the printing unit 33, the IPP function unit 51, and the web server function unit 52.

The IPP function unit 51 is a function unit realized by the control unit 31 of the printer 3 executing a control program.

The IPP function unit 51 performs communication with the IPP/USB conversion program 43 via the USB cable 4. Moreover, the IPP function unit 51 performs communication with the web server function unit 52 in accordance with HTTP, and performs communication with the printing unit 33 in accordance with a certain protocol.

The web server function unit 52 is also realized by the control unit 31 of the printer 3 executing a control program. Upon receiving a request for transmission of screen data, the web server function unit 52 executes processing in which screen data to be displayed on the configuration screen 60 is generated by executing a configuration-screen CGI. Upon receiving a value set by using the configuration screen 60, the web server function unit 52 executes processing in which the set value is set in the printer 3 by executing a printer-configuration CGI, or the like.

(3) Interfaces for USB Devices

Next, interfaces for USB devices will be described. In accordance with the USB protocol, one physical USB cable 4 has one or more logical communication channels called "Interfaces".

In accordance with the USB protocol, a special endpoint called "endpoint 0" for performing control transfer must be provided. At Endpoint 0 two-way communication is available. The "Interfaces" are provided on the basis of interface descriptors obtained from the printer 3 through endpoint 0. Each of the "Interfaces" generally has one or more endpoints.

In the printer 3 according to the first embodiment, "Interface" 1 and "Interface 2" are configured in the single physical USB cable 4. Furthermore, the "Interface 1" and "Interface 2" each have an endpoint for reading and an endpoint for writing, and enable two-way communication by using these endpoints.

The above-described communication (a) for choosing settings for the printer 3 is performed through the "Interface 1". The above-described communication (b) for transmitting print data to the printer 3 is performed through the "Interface 2".

Note that the interface 2 may not have to be provided and both the communication (a) for choosing settings for the printer 3 and the communication (b) for transmitting print data to the printer 3 may be performed through the "Interface 1".

(4) Exclusion Processing for Session

Next, exclusion processing for a session established between the web browser 42 and the IPP/USB conversion program 43 will be described. Here, the communication (a) for choosing settings for the printer 3 will be described as an example.

Figure 3:
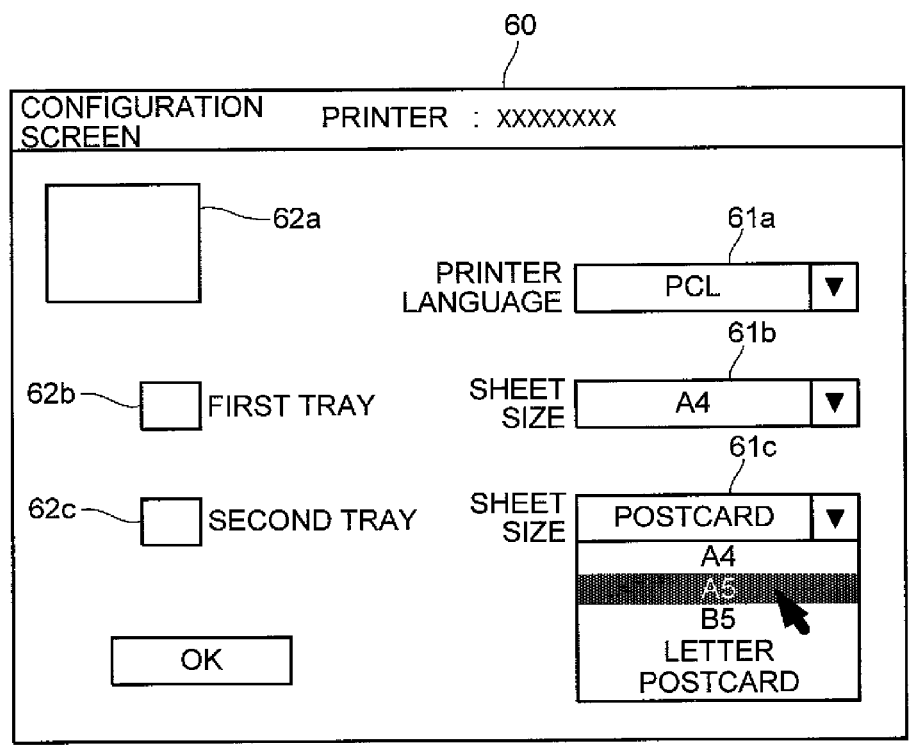
FIG. 3 is a schematic diagram illustrating an example of a configuration screen for the printer.

First, the configuration screen 60 of the printer 3 will be described with reference to FIG. 3. On the configuration screen 60 illustrated in FIG. 3, settings for a printer language 61a, a sheet size 61b of sheets set in the first tray, and a sheet size 61c of sheets set in the second tray may be chosen.

Moreover, images 62a, 62b, and 62c are displayed on the configuration screen 60. Here, the images 62a, 62b and 62c are called GIF1, GIF2, and GIF3, respectively.

The web browser 42 requests establishment of a session to the port "80" of localhost, and requests transmission of screen data of the configuration screen 60 to the IPP/USB conversion program 43 through the established session. This request is made by transmitting a GET command.

The above-described GET command is transmitted by the IPP/USB conversion program 43 to the IPP function unit 51 via the USB cable 4 and is transmitted from the IPP function unit 51 to the web server function unit 52. Upon receiving the GET command, the web server function unit 52 executes the configuration-screen CGI and generates the screen data of the configuration screen 60. Then, as a response to the above-described GET command, the web server function unit 52 transmits the screen data, which is generated by executing the configuration-screen CGI, to the IPP function unit 51.

Upon receiving the screen data from the web server function unit 52, the IPP function unit 51 transmits the screen data to the IPP/USB conversion program 43 via the USB cable 4.

Upon receiving the screen data from the IPP function unit 51, the IPP/USB conversion program 43 transmits the screen data to the web browser 42 as a response to the GET command received from the web browser 42.

The web browser 42 analyzes this screen data, and requests likewise items that are needed (such as the GIF1, GIF2, and GIF3) to display a page. The web browser 42 may perform multi-session communication. Thus, in this case, for each of the items that are needed (the GIF1, GIF2, and GIF3), the web browser 42 establishes a session and requests transmission of the item, which is an image.

For example, first, the web browser 42 requests establishment of a session used to request transmission of the GIF1. Without waiting for a response to a processing request transmitted through the session, the web browser 42 requests establishment of a session used to request transmission of the GIF2. Likewise, without waiting for a response to a processing request transmitted through the session used to request transmission of GIF2, the web browser 42 requests establishment of a session used to request transmission of the GIF3.

However, USB interfaces do not support multi-session communication. Moreover, the IPP function unit 51 may respond to each of the GET commands regardless the receipt order of the GET commands.

Thus, in the case where each session performs communication through the "Interface 1", when the IPP/USB conversion program 43 receives a response from the IPP function unit 51, the IPP/USB conversion program 43 is unable to determine which session is the session through which a processing request corresponding to the response is received. Thus, mixing up of responses may occur such that a response for a session is transmitted as a response for another session, or the like.

Hence the IPP/USB conversion program 43 according to the first embodiment relays communication through only one session at a time by executing exclusion processing.

(5) Overall Flow of Communication

Figure 4:
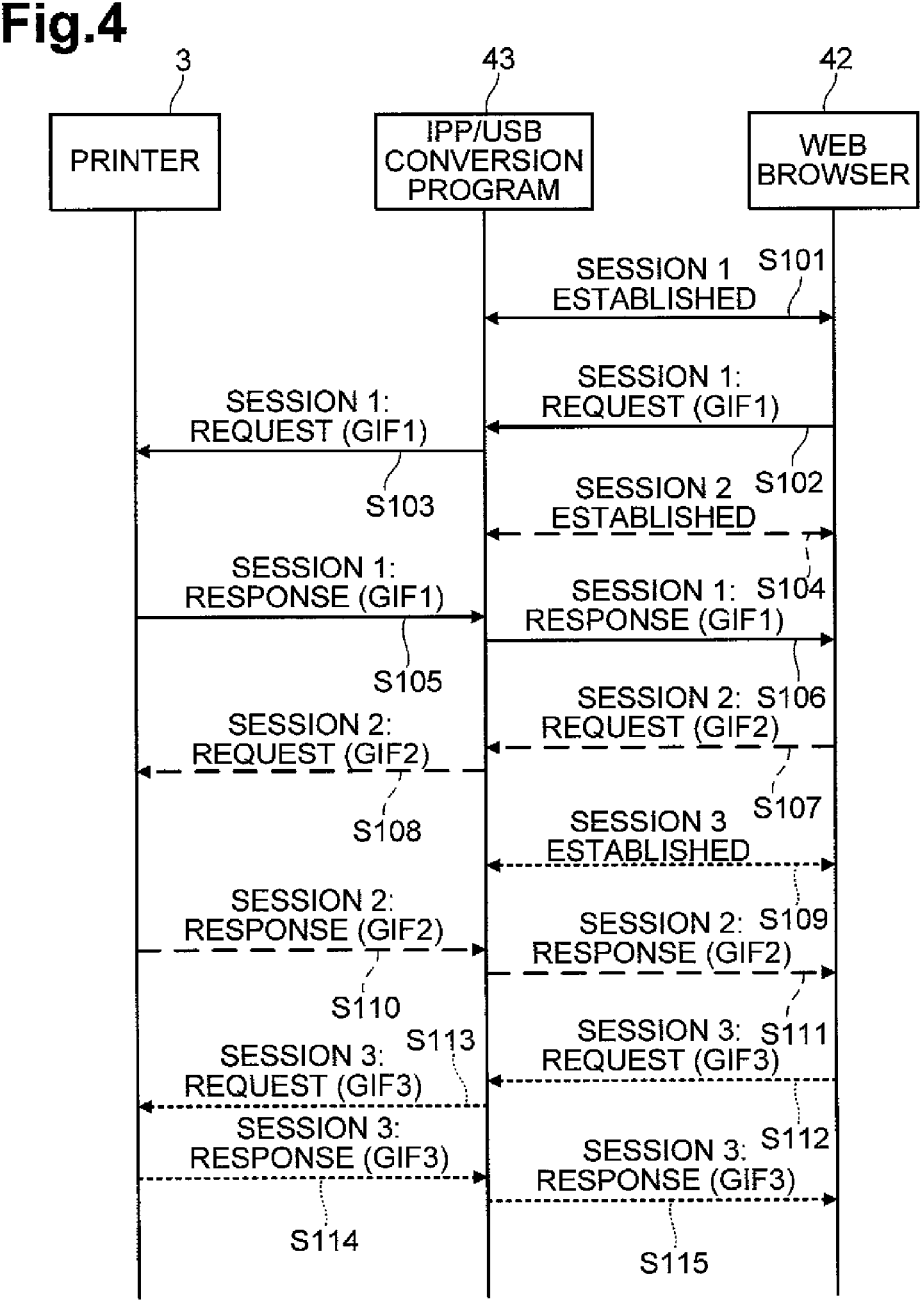
FIG. 4 is a sequence chart illustrating the overall flow of communication relay processing.

The overall flow of communication will be described with reference to FIG. 4. Here, the communication (a) for choosing settings for the printer 3 will be described as an example. As described above, the communication (a) for choosing settings for the printer 3 is performed through the "Interface 1".

Here, it is assumed that the web browser 42 has already finished analyzing the screen data of the configuration screen

60, which has been received from the IPP/USB conversion program 43. In the following, requesting of transmission of the GIF1, GIF2, and GIF3 from the IPP/USB conversion program 43 and thereafter will be described.

In addition, here, the IPP function unit 51 and the web server function unit 52 are collectively called the printer 3.

The web browser 42 first requests establishment of a session 1 from the IPP/USB conversion program 43. When establishment of the session 1 is requested, the IPP/USB conversion program 43 establishes the session 1 between the IPP/USB conversion program 43 and the web browser 42 (step S101) and prohibits communication through sessions other than the session 1. Then, the IPP/USB conversion program 43 relays communication between the web browser 42 and the IPP function unit 51 through the session 1 (steps S102, S103, S105, and S106). Here, the above-described communication is performed from when the web browser 42 requests the GIF 1 to when the web browser 42 receives the GIF 1.

After having requested establishment of the session 1, the web browser 42 requests establishment of a session 2 without waiting for completion of reception of the GIF1 through the session 1. When establishment of the session 2 is requested, the IPP/USB conversion program 43 establishes the session 2 between the IPP/USB conversion program 43 and the web browser 42 (step S104). However, since communication through sessions other than the session 1 is prohibited, the session 2 enters a waiting state.

When relaying of communication through the session 1 is completed (step S106), the IPP/USB conversion program 43 permits communication through a session other than the session 1. As a result, the session 2 exits the waiting state. When the session 2 exits the waiting state, the IPP/USB conversion program 43 relays communication between the web browser 42 and the IPP function unit 51 through the session 2 (steps S107, S108, S110, and S111).

Likewise, a session 3 enters a waiting state until the web browser 42 finishes reception of the GIF2 through the session 2, and communication is started through the session 3 when reception of the GIF2 is completed.

By performing such a series of pieces of processing, the GIF1 to GIF3 are read by the web browser 42, and the GIF1 to GIF3 are displayed on the configuration screen 60.

An operation input through the configuration screen 60 is converted into a processing request such as a GET command, a PUT command, a POST command, or the like according to HTTP and transmitted to the printer 3 likewise via the IPP/USB conversion program 43. As a result, the settings for the printer 3 may be chosen via the USB cable 4 using the same procedure that is used for choosing the settings for the printer 3 via an conventional TCP/IP network or a similar procedure to that.

(6) Data Structure of Processing Request and Data Structure of Response

Next, the data structure of a processing request, which has been described above, and the data structure of a response transmitted from the printer 3 in response to a processing request will be described.

(6-1) Data Structure of Processing Request

First, the data structure of a processing request will be described. Here, a POST command will be described as an example. The data structure of a processing request conforms to the specification of HTTP and is widely used, and thus, only the overview thereof will be described. A processing request includes one or more pieces of communication data.

In the following, an example of such a processing request is shown. Here, line number is shown in brackets before each piece of communication data.

```
[line 1] POST /ipp/[function] HTTP/1.1<CR><LF>
[line 2] Host: localhost<CR><LF>
[line 3] Content-Type: application/ipp<CR><LF>
[line 4] Transfer-Encoding: chunked<CR><LF>
[line 5] <CR><LF>
```

In the above-described example, each line represents one piece of communication data. Moreover, as is clear from the above-described example, the end of each piece of communication data is <CR><LF>, which is a carriage return and line feed code.

Moreover, the last piece of communication data of the processing request is only <CR><LF> as shown in line 5. Thus, when the received piece of communication data is only <CR><LF>, it is determined that reception of one processing request is completed.

Note that, in a PUT command and a POST command, additional data such as binary data or text data is usually added to this series of pieces of communication data. Here, the additional data and this series of pieces of communication data are together called a processing request.

In the case where the number of bytes of all additional data is unknown, there may be a case where a line such as "Transfer-Encoding: chunked" is inserted and it indicates that small blocks of data follow. In this case, the size of each block of data is shown.

Moreover, in the case where additional data is added, there may also be a case where a line such as "Content-Length: 4554" is inserted instead of "chunked" described above in the processing request and it indicates that additional data having a specified number of bytes (4554 in this case) follows.

Each piece of communication data, additional data, or each of small blocks of data into which additional data is divided is each an example of a piece of partial processing request data. That is, the IPP/USB conversion program 43 receives a processing request as a plurality of pieces of partial processing request data from the web browser 42.

Note that, various forms are conceivable for a piece of partial processing request data, depending on how processing is performed. For example, a processing request is received in units of a piece of data each having a fixed length or a data length determined under specific conditions, and each piece of data may be treated as a piece of partial processing request data.

(6-2) Data Structure of Response

The data structure of a response also conforms to the specification of HTTP and is widely used, and thus, only the overview thereof will be described. A response includes one or more pieces of communication data, too. The last piece of communication data is only <CR><LF>. Moreover, similarly to the case of a processing request, additional data such as binary data or text data is added to a response to a GET command. For example, the above-described GIF1 to GIF3 are additional data to be added to a response to a GET command.

Each piece of communication data, additional data, or each of small blocks of data into which additional data is divided is an example of a piece of partial response data. That is, the IPP/USB conversion program 43 receives a response as a plurality of pieces of partial response data from the IPP function unit 51. Note that, various forms are conceivable for a piece of partial response data, depending on how processing is performed.

(7) Issue of Communication Relay Processing

As described above, the IPP/USB conversion program 43 receives a processing request as a plurality of pieces of partial processing request data from the web browser 42. In this case, the IPP/USB conversion program 43 may transmit pieces of partial processing request data in the order of pieces of partial processing request data received to the IPP function unit 51 without waiting for completion of reception of all pieces of partial processing request data.

However, there may be a case where communication between the web browser 42 and the IPP/USB conversion program 43 is lost for some reason in the middle of communication before the IPP/USB conversion program 43 transmits all pieces of partial processing request data to the IPP function unit 51. For example, there may be a case where communication is lost since a user clicks a cancel button of the web browser 42, or finishes the web browser 42. In this case, a system for notifying the IPP function unit 51 that communication between the web browser 42 and the IPP/USB conversion program 43 is lost in the middle of communication has not been taken into account before. Thus, the IPP function unit 51 is unable to recognize that communication between the web browser 42 and the IPP/USB conversion program 43 is lost.

As a result, in the case where pieces of partial processing request data are transmitted to the IPP function unit 51 in the order of pieces of partial processing request data received, even when communication between the web browser 42 and the IPP/USB conversion program 43 is lost before the IPP function unit 51 receives all pieces of partial processing request data, the IPP function unit 51 expects reception of the next piece of partial processing request data and is in a reception waiting state for a long period of time.

In the above-described communication relay processing, the IPP/USB conversion program 43 according to the first embodiment starts transmission of the processing request to the IPP function unit 51 after reception of a processing request from the web browser 42 is completed. In the following, details of communication relay processing will be described.

(8) Details of Communication Relay Processing Performed by IPP/USB Conversion Program 43

In communication relay processing, the IPP/USB conversion program 43 executes thread generation processing and processing in which a processing request is received from a web browser, both of which will be described next.

(8-1) Thread Generation Processing

Figure 5:
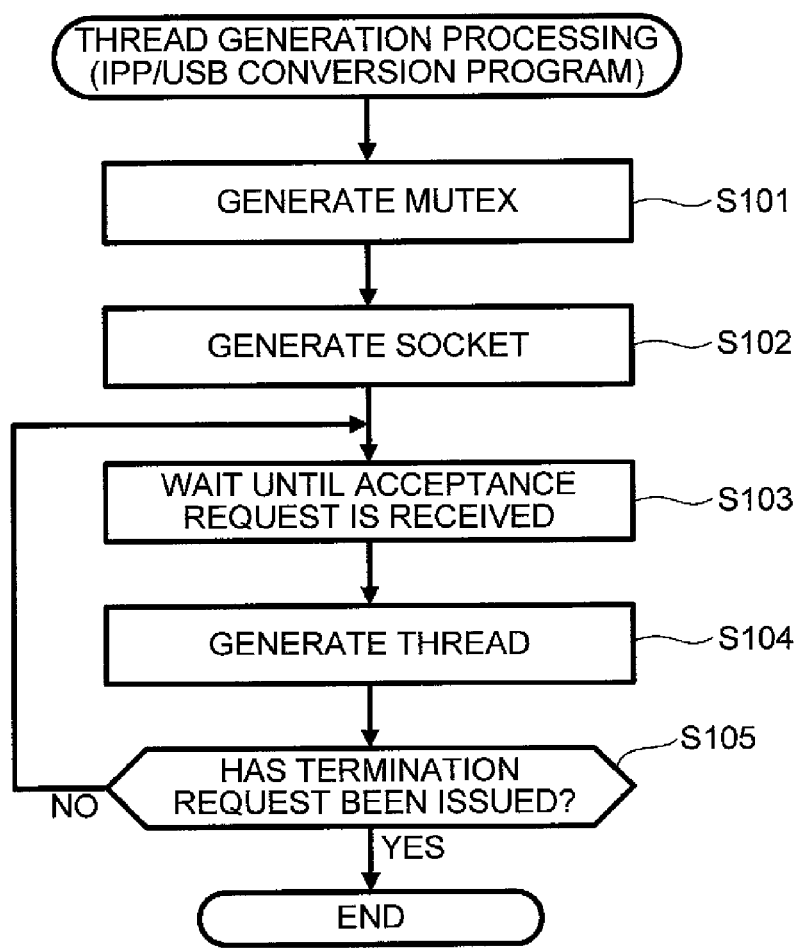
FIG. 5 is a flowchart of thread generation processing.

First, thread generation processing will be described with reference to FIG. 5. As described above, the IPP/USB conversion program 43 is executed as a resident program and the thread generation processing is stated when the PC 2 is turned on.

Here, the thread generation processing is processing in which communication is relayed between the web browser 42 and the IPP function unit 51. Processing for relaying communication between the spooler 44 and the IPP function unit 51 is executed as processing that is different from the thread generation processing. The description of the processing that is different from the thread generation processing is omitted.

In step S101, the IPP/USB conversion program 43 generates a Mutex for executing exclusion processing for a session. A Mutex is a system for performing exclusion processing, the system being provided in a programming language. Details of a Mutex will be described later. The Mutex is deleted when the Mutex is not necessary.

Note that a case where exclusion processing is performed by using the Mutex is described here as an example; however, the way in which exclusion processing is performed is not limited thereto. For example, a semaphore may be used, or an original method may be used without using a Mutex or a semaphore.

In step S102, the IPP/USB conversion program 43 generates a socket and performs setting of the socket, the socket monitoring a request for establishment of a session (the request is called an acceptance request). A socket is a simplified interface for performing communication in accordance with TCP/IP. Moreover, setting of the socket refers to setting of the IP address, port number, and the like of the PC 2 for the socket and also refers to setting of the operation mode of the socket to a monitoring mode of an acceptance request, the port number indicating a port that is a monitoring target. In the first embodiment, the IP address is set to "127.0.0.1" and the port number is set to "80".

When a user starts the web browser 42 and set the IP address to "127.0.0.1" and the port number to "80", the web browser 42 requests establishment of communication from the IP address and the port having the port number. This request is an acceptance request.

In step S103, the IPP/USB conversion program 43 waits until the IPP/USB conversion program 43 receives an acceptance request from the web browser 42. When the IPP/USB conversion program 43 receives an acceptance request, the procedure proceeds to step S104.

In step S104, the IPP/USB conversion program 43 generates a thread.

In step S105, the IPP/USB conversion program 43 determines whether or not a termination request has been issued from the OS 41. This termination request is a request for termination of the IPP/USB conversion program 43, which is a resident program. Since the IPP/USB conversion program 43 is a resident program, normally "No" is obtained. However, when termination of the IPP/USB conversion program 43 is instructed through a user operation or the like, the termination request is accepted. In the case where the termination request has been issued, the IPP/USB conversion program 43 finishes the thread generation processing. In the case where the termination request has not been issued, the procedure returns to step S103 and processing in and after S103 is repeated.

(8-2) Processing for Receiving Processing Request from Web Browser

Figure 6:
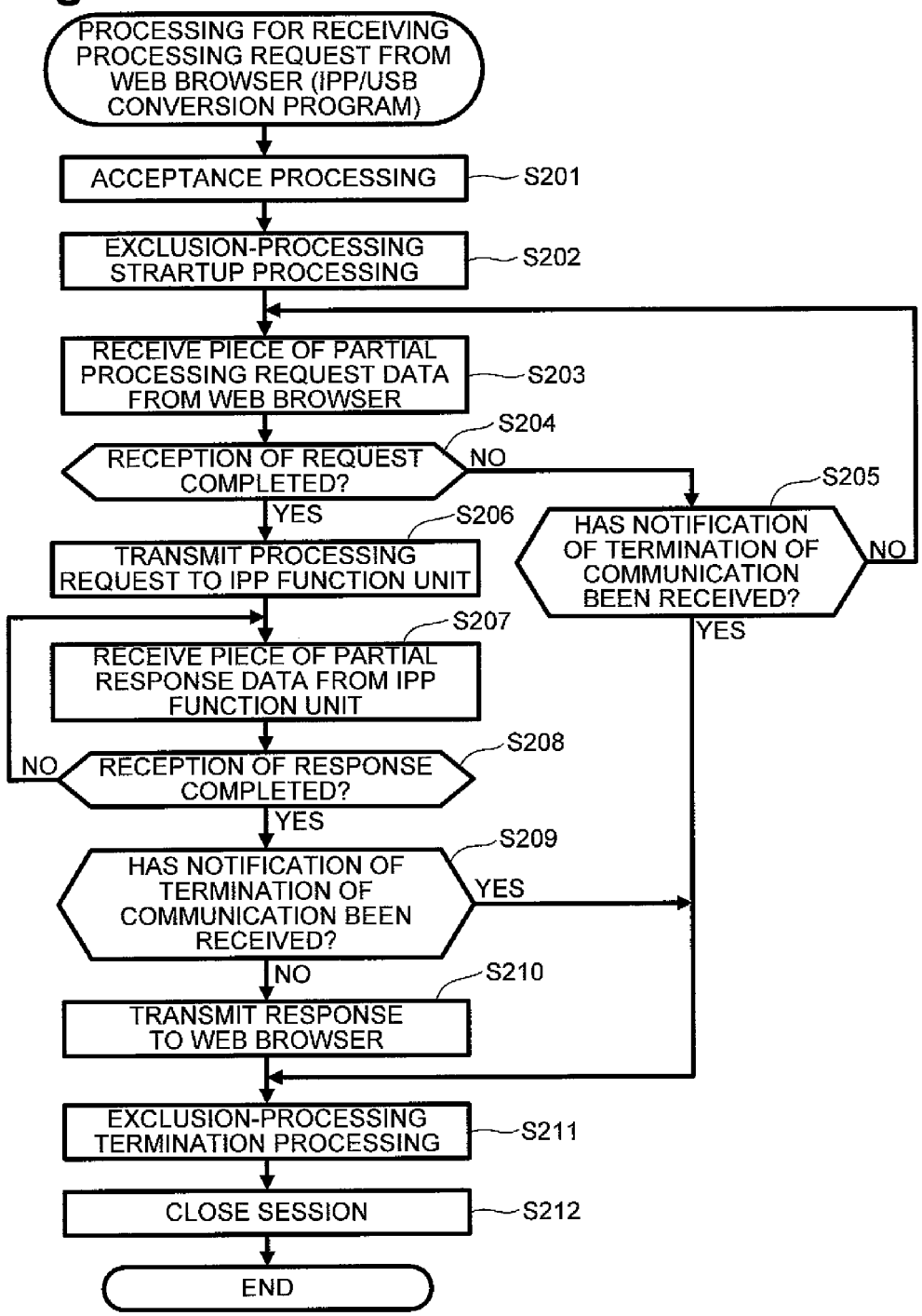
FIG. 6 is a flowchart of processing for receiving a processing request from a web browser.

Next, processing in which the IPP/USB conversion program 43 receives a processing request from the web browser 42 will be described with reference to FIG. 6. This processing is executed by a thread generated in step S104, which is described above. That is, in the case where there is a plurality of acceptance requests, for each acceptance request, this processing is executed by a different thread. Thus, only a single session is handled in the flowchart of FIG. 6. In the case where there are a plurality of sessions, processing illustrated in the flowchart of FIG. 6 is performed in parallel by different threads.

In step S201, a particular thread executes acceptance processing. Acceptance processing is processing for establishing a new session between the IPP/USB conversion program 43 and a program that has transmitted an acceptance request (that is, the web browser 42). Step S201 is an example of first establishment processing.

Specifically, a particular thread generates a new socket used to perform communication with the web browser 42, and establishes a session between the IPP/USB conversion program 43 and the web browser 42 using the generated socket. In another example, information may be transmitted to the printer 3 by performing control transfer in which endpoint 0 of a USB device is used, at a timing at which the socket is opened, closed, accepted, or the like, and synchronization with the printer 3 may be achieved at the timing at which the socket is opened, closed, accepted, or the like.

In step S202, the particular thread executes exclusion-processing startup processing in which communication through sessions other than the new session established in step S201 is prohibited.

Specifically, the particular thread tries to obtain the Mutex generated in step S101. In the case where the Mutex is not obtained by another thread, the particular thread obtains the Mutex. The another threads that later try to obtain the Mutex are in a waiting state until the particular thread releases the Mutex. That is, the another threads are in a state in which communication is prohibited.

In contrast, in the case where the Mutex is obtained by another thread, the particular thread is in the waiting state until the another thread releases the Mutex. That is, the particular thread is in the state in which communication is prohibited. Then, when the another thread releases the Mutex, if there is further another thread that has entered the waiting state prior to the particular thread, the further another thread obtains the Mutex and the particular thread is still in the waiting state. If there is no thread that has entered the waiting state prior to the particular thread, the particular thread obtains the Mutex.

When the particular thread obtains the Mutex, the procedure proceeds to step S203.

Here, step S202 described above is an example of first prohibition determination processing, first waiting processing, and first exclusion processing. That is, the IPP/USB conversion program 43 realizes these pieces of processing by using a system of a Mutex.

In step S203, the thread receives a piece of partial processing request data from the web browser 42 through the session established in step S201. Step S203 is an example of first request reception processing.

In step S204, the thread determines whether or not reception of one processing request has been completed. Specifically, the thread determines the end of data in accordance with the HTTP protocol. For example, the thread determines the end of data by checking the presence or absence of <CR><LF> or the size of additional data represented by Content-Length or Transfer-Encoding: chunked. As a result, it may be determined whether or not reception of one processing request has been completed.

When the thread determines that reception of one processing request has not been completed, the procedure proceeds to step S205. When the thread determines that reception of one processing request has been completed, the procedure proceeds to step S206.

In step S205, the thread determines whether or not notification of termination of communication has been received from the web browser 42. Specifically, the thread determines whether or not the session established in step S201 has been closed by the web browser 42. When it is determined that the session has been closed, the thread determines that notification of termination of communication has been received. When it is determined that notification of termination of communication has not been received, the procedure returns to step S203 and processing in and after step S203 is repeated.

When it is determined that notification of termination of communication has been received, the thread discards a part of a processing request, the part of the processing request having been received, and the procedure proceeds to step S211. Step S205 is an example of first termination determination processing.

In step S206, the thread transmits the processing request received from the web browser 42 to the IPP function unit 51. Step S206 is an example of first request transmission processing.

In step S207, the thread receives, from the IPP function unit 51, a response to the processing request transmitted to the IPP function unit 51. Specifically, the IPP function unit 51 divides a response into a plurality of pieces of partial response data and transmits them to the IPP/USB conversion program 43. In step S207, a piece of partial response data is received.

In step S208, the thread determines whether or not reception of the response from the IPP function unit 51 has been completed. This determination is performed in a procedure similar to step S204. When it is determined that reception of the response has not been completed, the procedure returns to step S207 and processing in and after step S207 is repeated. When it is determined that reception of the response has been completed, the procedure proceeds to step S209.

In step S209, the thread determines whether or not notification of termination of communication has been received from the web browser 42 between processing in step S207 and processing in step S208. Note that, after step S205 is last executed and before step S209 is executed, the thread may determine whether or not notification of termination of communication has been received from the web browser 42. As described above, whether or not notification of termination of communication has been received is determined on the basis of whether or not the session has been closed by the web browser 42. When it is determined that notification of termination of communication has not been received, the procedure proceeds to step S210. When it is determined that notification of termination of communication has been received, the procedure proceeds to step S211.

In step S210, the thread transmits the response received from the IPP function unit 51 to the web browser 42.

In step S211, the thread executes exclusion-processing termination processing. Specifically, the thread releases the Mutex. Step S211 is an example of first permission processing. Thus, the exclusion processing is performed from step S202 to step S211, in other words, until when transmission of all pieces of partial processing request data and all pieces of partial response data in the session is completed in steps S206 and S210. During this period, a piece of partial processing request data or a piece of partial response data in another session does not cause any interruption due to processing performed by another thread.

In step S212, the thread closes the session generated in step S201 and finishes the processing.

Note that, although not illustrated in the above-described flowchart, when connection via the USB cable 4 is cut off for some reason while the thread is communicating with the IPP function unit 51, communication is terminated and the web browser 42 may be notified of an error in accordance with a form based on HTTP.

(7) Effects of First Embodiment

The above-described IPP/USB conversion program 43 starts transmission of the processing request to the printer 3 only after reception of a processing request from the web browser 42 has been completed. Specifically, the IPP/USB conversion program 43 starts transmission of the processing request to the printer 3 only in the case where it is determined that notification of termination of communication has not been received in step S205 and reception of the processing request has been completed in step S204. Thus, when the IPP/USB conversion program 43 receives notification of termination of communication from the web browser 42 while receiving a processing request from the web browser 42, the IPP/USB conversion program 43 does not start transmission of the processing request to the printer 3.

Thus, in the case where communication is relayed using the IPP/USB conversion program 43 between the printer 3 and the web browser 42, communication may be lost between the web browser 42 and the IPP/USB conversion program 43 in the middle of communication. Even in such a case, the printer 3 may be prevented from remaining in a reception waiting state for a long period of time.

Furthermore, in the case where the IPP/USB conversion program 43 is used, while a processing request is being relayed through any one of sessions, communication through the other sessions is prohibited. Thus, incorrectly treating a response to a processing request for one session as a response for another session may be prevented. Moreover, processing for terminating communication is performed only for a session through which notification of termination of communication is received. Thus, termination of communication may be performed only for a part of processing requests from the web browser 42.

Second Embodiment

Figure 7:
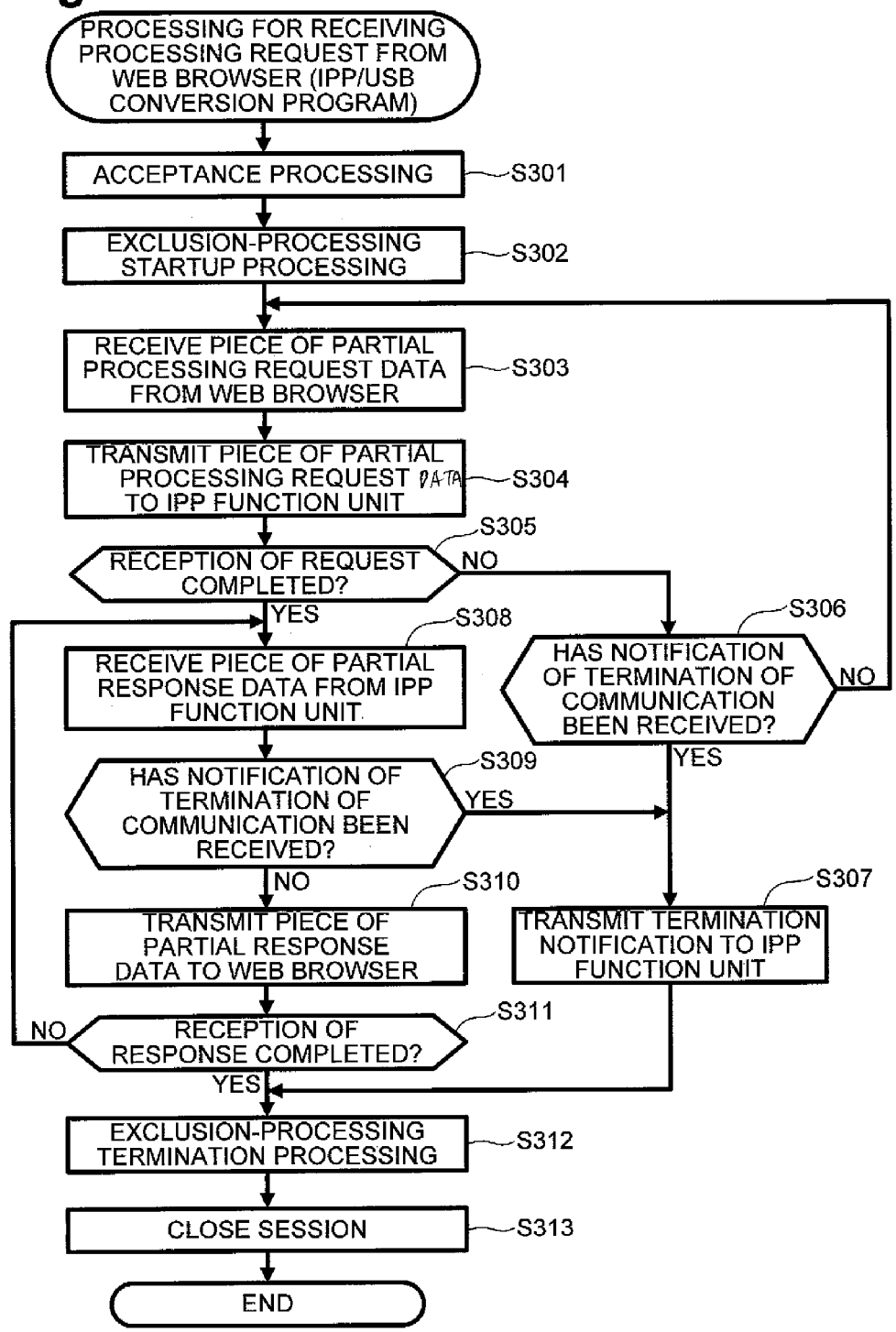
FIG. 7 is a flowchart of processing for receiving a processing request from a web browser according to a second embodiment.
Figure 8:
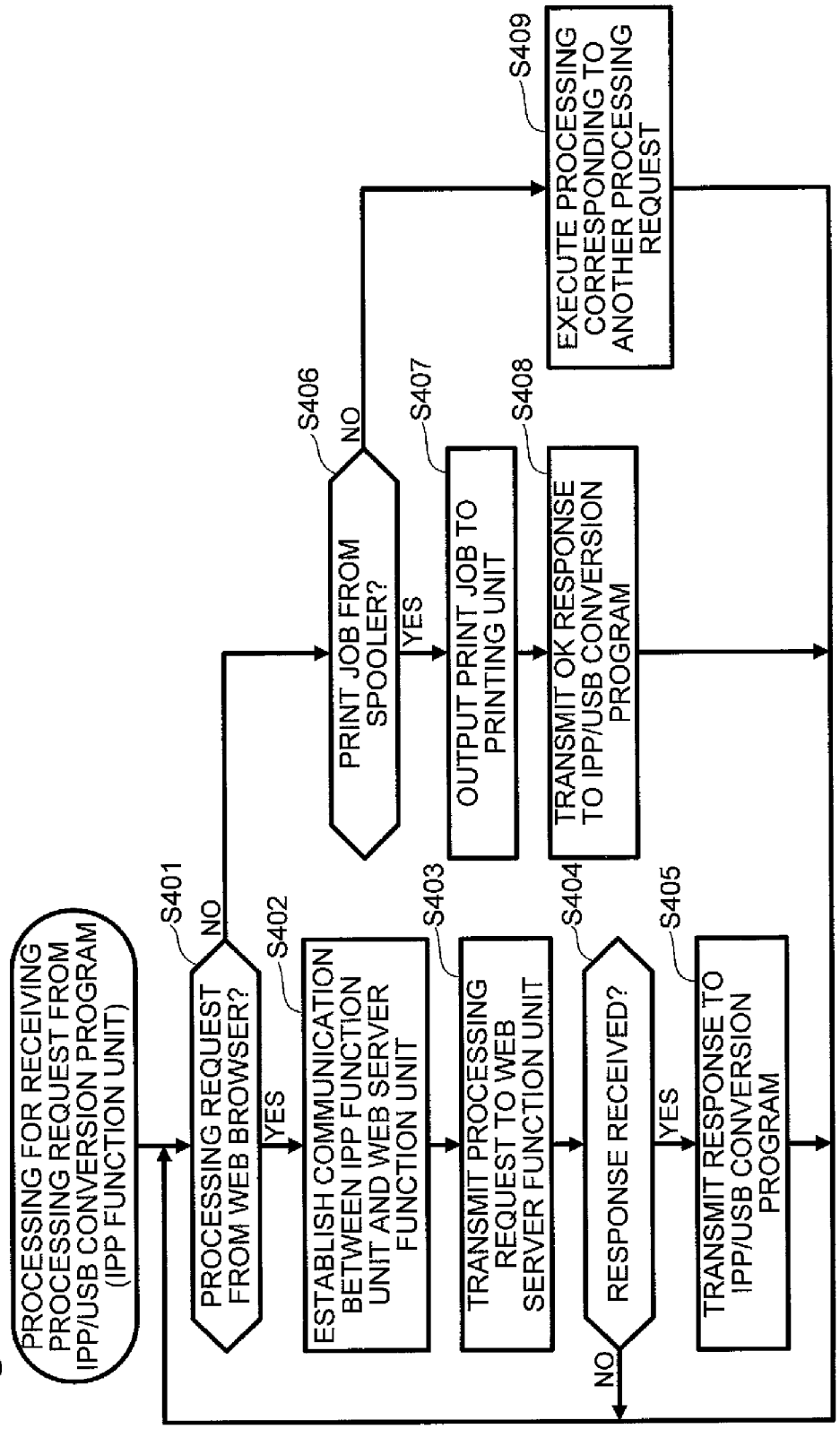
FIG. 8 is a flowchart of processing for receiving a processing request from an IPP/USB conversion program.
Figure 9:
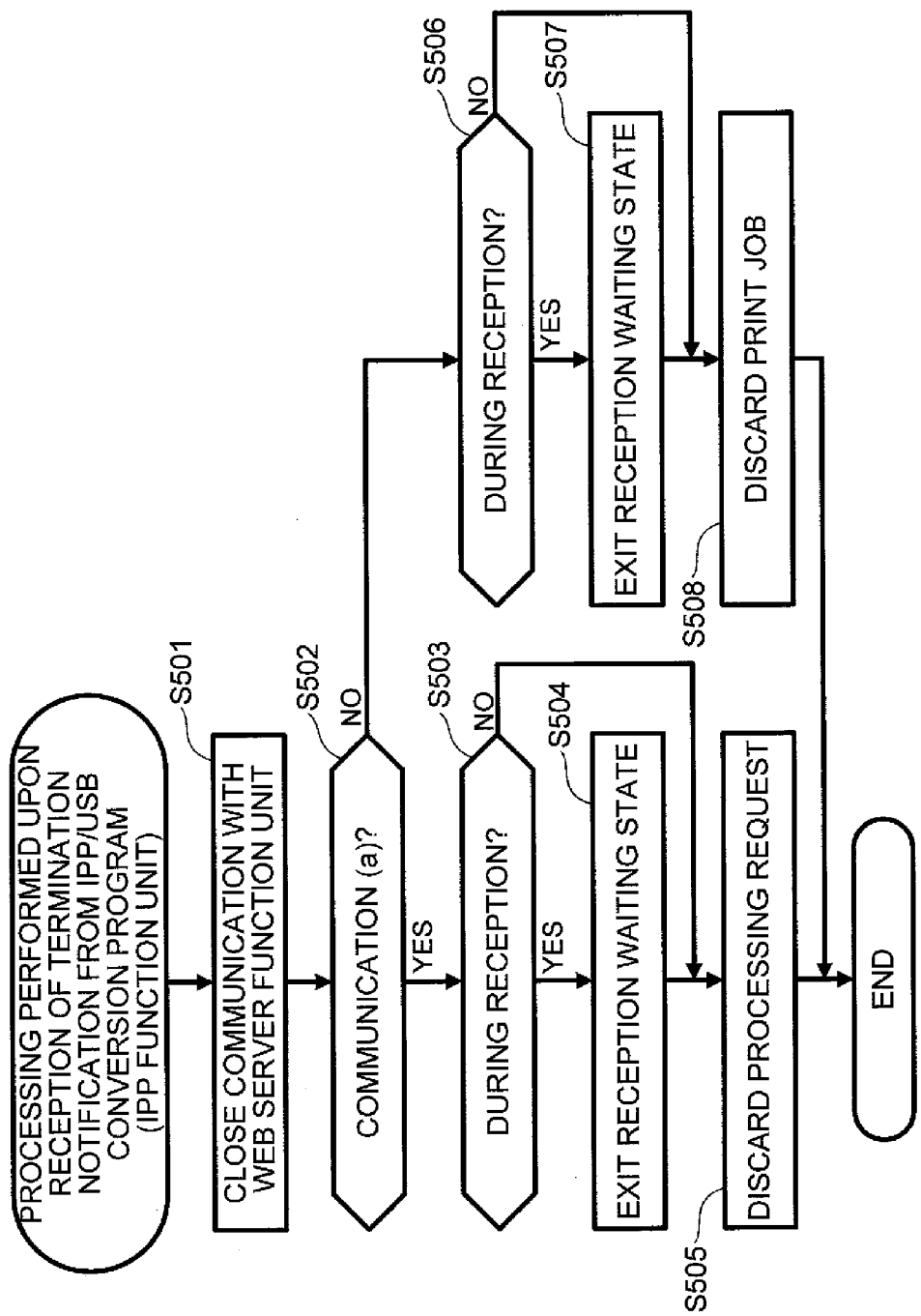
FIG. 9 is a flowchart for receiving a termination notification from the IPP/USB conversion program.

Next, a second embodiment will be described with reference to FIGS. 7 to 9.

After completing reception of a processing request from the web browser, the IPP/USB conversion program 43 according to the above-described first embodiment starts transmission of the processing request to the IPP function unit 51. In contrast, upon starting reception of a processing request from the web browser 42, the IPP/USB conversion program 43 according to the second embodiment starts transmission of the processing request to the IPP function unit 51 without waiting for completion of reception of the processing request.

In this case, there may be a case where the IPP/USB conversion program 43 receives notification of termination of communication from the web browser 42 before the IPP/USB conversion program 43 completes reception of the processing request and, as a result, communication is lost between the IPP/USB conversion program 43 and the web browser 42. In such a case, the IPP function unit 51 is unable to know that communication is lost between the IPP/USB conversion program 43 and the web browser 42, and thus the IPP function unit 51 is in the reception waiting state for a long period of time waiting for the remainder of the processing request.

Thus, the IPP/USB conversion program 43 according to the second embodiment notifies the IPP function unit 51 of termination of communication upon receiving notification of termination of communication from the web browser 42.

(7) Communication Relay Processing Performed by IPP/USB Conversion Program (7-1) Thread Generation Processing Thread generation processing according to the second embodiment is substantially the same as that in the first embodiment, and thus description thereof will be omitted.

(7-2) Processing for Receiving Processing Request from Web Browser

Processing in which the IPP/USB conversion program 43 according to the second embodiment receives a processing request from the web browser 42 will be described with reference to FIG. 7.

In step S301, a thread executes acceptance processing. Step S301 is an example of second establishment processing.

In step S302, the thread executes exclusion-processing startup processing in which communication through sessions other than a new session established in step S301 is prohibited. Step S302 is an example of second prohibition determination processing, an example of second waiting processing, and an example of second exclusion processing.

In step S303, the thread receives a piece of partial processing request data from the web browser 42 through the session established in step S301. Step S303 is an example of second request reception processing.

In step S304, the thread transmits the piece of partial processing request data received in step S303 to the IPP function unit 51. Step S304 is an example of second request transmission processing.

In step S305, the thread determines whether or not reception of one processing request has been completed. When it is determined that reception of one processing request has not been completed, the procedure proceeds to step S306. When it is determined that reception of one processing request has been completed, the procedure proceeds to step S308.

In step S306, the thread determines whether or not notification of termination of communication has been received from the web browser 42. Specifically, the thread determines whether or not the session established in step S301 has been closed by the web browser 42. When it is determined that the session has been closed, it is determined that notification of termination of communication has been received. When it is determined that notification of termination of communication has not been received, the procedure returns to step S303 and processing in and after step S303 is repeated. In contrast, when it is determined that notification of termination of communication has been received, the procedure proceeds to step S307. Step S306 is an example of second termination determination processing.

In step S307, the thread transmits a termination notification to the IPP function unit 51 and notifies the IPP function unit 51 of termination of communication. A termination notification is transmitted to the IPP function unit 51 by performing control transfer through the interface 0. Step S307 is an example of first termination notification processing. After step S307 is performed, exclusion-processing termination processing is performed in step S312 in which a thread that is in a waiting state waiting for completion of the session is caused to enter a ready state. In step S313, the session is closed.

In step S308, the thread receives, from the IPP function unit 51, a response to the processing request transmitted to the IPP function unit 51. Specifically, the IPP function unit 51 divides the response into a plurality of pieces of partial response data and transmits them to the IPP/USB conversion program 43. In step S308, a piece of partial response data is received.

In step S309, the thread determines whether or not notification of termination of communication has been received from the web browser 42 during processing performed in a loop from step S308 to step S311. When it is determined that notification of termination of communication has not been received, the procedure proceeds to step S310. When it is determined that notification of termination of communication has been received, the procedure proceeds to step S307 and a termination notification is transmitted to the IPP function unit 51 as described above.

In step S310, the thread transmits the piece of partial response data received from the IPP function unit 51 to the web browser 42.

In step S311, the thread determines whether or not reception of the response from the IPP function unit 51 has been completed. This determination is performed in a procedure similar to step S305. When it is determined that reception of the response has been completed, the procedure proceeds to step S312. When it is determined that reception of the response has not been completed, the procedure returns to step S308 and processing in and after step S308 is repeated.

In step S312, the thread executes exclusion-processing termination processing. Step S312 is an example of second permission processing.

In step S313, the thread closes the session generated in step S301 and finishes the processing.

Note that, although not illustrated in the above-described flowchart, when connection via the USB cable 4 is cut off for some reason while the thread is communicating with the IPP function unit 51, communication is terminated and the web browser 42 may be notified of an error in accordance with a form based on HTTP.

(2) Processing Performed by IPP Function Unit

Next, processing performed by the IPP function unit 51 according to the second embodiment will be described.

(2-1) Processing for Receiving Processing Request from IPP/USB Conversion Program First, processing in which the IPP function unit 51 according to the second embodiment receives a processing request from the IPP/USB conversion program 43 through the "Interface 1" or "Interface 2" will be described with reference to FIG. 8.

This processing is executed repeatedly when the power of the printer 3 is in an ON state.

In step S401, the IPP function unit 51 determines whether or not what is received from the IPP/USB conversion program 43 is a processing request from the web browser 42. When it is determined that a processing request from the web browser 42 is received, the procedure proceeds to step S402. When it is determined that something else is received, the procedure proceeds to step S406.

In step S402, the IPP function unit 51 establishes communication between the IPP function unit 51 and the web server function unit 52. This communication may be established as a session based on TCP/IP, or may also be established in a communication method specific to the printer 3 (for example, data transmission using a common memory). Step S402 is an example of fourth establishment processing.

In step S403, the IPP function unit 51 transmits a processing request to the web server function unit 52 through the communication established in step S402. Step S403 is an example of fourth request transmission processing.

In step S404, the IPP function unit 51 determines whether or not a response has been received from the web server function unit 52 within a predetermined time period. When it is determined that a response has been received, the procedure proceeds to step S405. When it is determined that a response has not been received, the procedure returns to step S401. Step S404 is an example of second response reception processing.

In step S405, the IPP function unit 51 transmits the response received from the web server function unit 52 through the "Interface 1" to the IPP/USB conversion program 43. Step S405 is an example of second response transmission processing.

In step S406, the IPP function unit 51 determines whether or not what is received from the IPP/USB conversion program 43 is a print job from the spooler 44. When it is determined that a print job from the spooler 44 has been received, the procedure proceeds to step S407. When it is determined that something else has been received, the procedure proceeds to step S409.

In step S407, the IPP function unit 51 outputs the received print job to the printing unit 33.

In step S408, the IPP function unit 51 transmits a response indicating that the print job has been successfully received (represented as OK RESPONSE in FIG. 8) to the IPP/USB conversion program 43 through the interface 2.

In step S409, the IPP function unit 51 executes processing corresponding to another processing request.

(2-2) Processing Performed Upon Reception of Termination Notification from IPP/USB Conversion Program Next, processing performed by the IPP function unit 51 upon reception of a termination notification from the IPP/USB conversion program 43 through the interface 0 will be described with reference to FIG. 9. Processing in which it is determined whether or not the IPP function unit 51 has received a termination notification is an example of fourth termination determination processing.

In step S501, the IPP function unit 51 finishes communication with the web server function unit 52. Step S501 is an example of first finishing processing.

In step S502, the IPP function unit 51 determines whether communication that is currently performed is the communication (a) for choosing settings for the printer 3 or the communication (b) for transmitting print data to the printer 3. When it is determined that communication that is currently performed is the communication (a) for choosing settings for the printer 3, the procedure proceeds to step S503. When it is determined that communication that is currently performed is not the communication (a) for choosing settings for the printer 3, the procedure proceeds to step S506.

In step S503, the IPP function unit 51 determines whether reception of the termination notification has occurred during reception of a processing request or during a period after completion of reception of a processing request and before transmission of a response to the IPP/USB conversion program 43. When it is determined that reception of the termination notification has occurred during reception of a processing request, the procedure proceeds to step S504. When it is determined that reception of the termination notification has not occurred during reception of a processing request, the procedure proceeds to step S505.

In step S504, the IPP function unit 51 exits a reception waiting state in which the IPP function unit 51 waits for a processing request coming from the IPP/USB conversion program 43.

In step S505, the IPP function unit 51 discards the processing request received from the IPP/USB conversion program 43.

In step S506, the IPP function unit 51 determines whether reception of the termination notification has occurred during reception of a print job or during a period after completion of reception of a print job and before transmission of a response to the IPP/USB conversion program 43. When it is determined that reception of the termination notification has occurred during reception of a print job, the procedure proceeds to step S507. When it is determined that reception of the termination notification has not occurred during reception of a print job, the procedure proceeds to step S508.

In step S507, the IPP function unit 51 exits a reception waiting state in which the IPP function unit 51 waits for a print job coming from the IPP/USB conversion program 43.

In step S508, the IPP function unit 51 discards the print job received from the IPP/USB conversion program 43, and initializes the printing unit 33 if necessary. Then the printing unit 33 may be in an idle state.

(3) Effects of Second Embodiment

The above-described IPP/USB conversion program 43 according to the second embodiment notifies the printer 3 of termination of communication in the case where notification of termination of communication has been received from the web browser 42 while a processing request is being received from the web browser 42.

Thus, in the case where communication is relayed using the IPP/USB conversion program 43 between the printer 3 and the web browser 42, communication may be lost between the web browser 42 and the IPP/USB conversion program 43 in the middle of communication. Even in such a case, the printer 3 may be prevented from remaining in a reception waiting state for a long period of time.

Furthermore, in the case where the IPP/USB conversion program 43 is used, while a processing request is being relayed through any one of sessions, communication through the other sessions is prohibited. Thus, incorrectly treating a processing request for one session as a processing request for another session may be prevented.

Moreover, in the printer 3 according to the second embodiment, in the case where the IPP function unit 51 is notified of termination of communication by the PC 2, the IPP function unit 51 finishes the session established between the IPP function unit 51 and the web server function unit 52. Thus, the web server function unit 52 may be prevented from remaining in a reception waiting state for a long period of time.

Furthermore, in the printer 3 according to the second embodiment, in the case where the PC 2 notifies the IPP function unit 51 of termination of communication after the IPP function unit 51 has transmitted a processing request received from the PC 2 to the web server function unit 52 and before the IPP function unit 51 transmits a response to the PC 2, the IPP function unit 51 discards a response transmitted from the web server function unit 52 without transmitting the response to the PC 2. Thus, in the case where communication is lost between the web browser 42 and the IPP/USB conversion program 43 in the middle of communication, the printer 3 may be prevented from transmitting a response to the PC 2.

Third Embodiment

Next, a third embodiment will be described with reference to FIGS. 10 to 17.

The third embodiment is a modified example of the second embodiment. Similarly to the IPP/USB conversion program 43 according to the second embodiment, upon starting reception of a processing request from the web browser 42, the IPP/USB conversion program 43 according to the third embodiment starts transmission of the processing request to the IPP function unit 51 without waiting for completion of reception of the processing request.

In this case, although the IPP/USB conversion program 43 according to the second embodiment performs the exclusion processing in units of a session, the IPP/USB conversion program 43 according to the third embodiment does not perform exclusion processing in units of a session.

Instead, the IPP/USB conversion program 43 according to the third embodiment transmits a session-information-added processing request to the IPP function unit 51, the session-information-added processing request being obtained by adding session information that identifies a session to a processing request received from the web browser 42. Then, the IPP/USB conversion program 43 receives a session-information-added response from the IPP function unit 51, the session-information-added response being a response to which session information is added. Then, the IPP/USB conversion program 43 transmits the response obtained by removing the session information from the session-information-added response, to the web browser 42 through the session identified by the session information.

Figure 10:
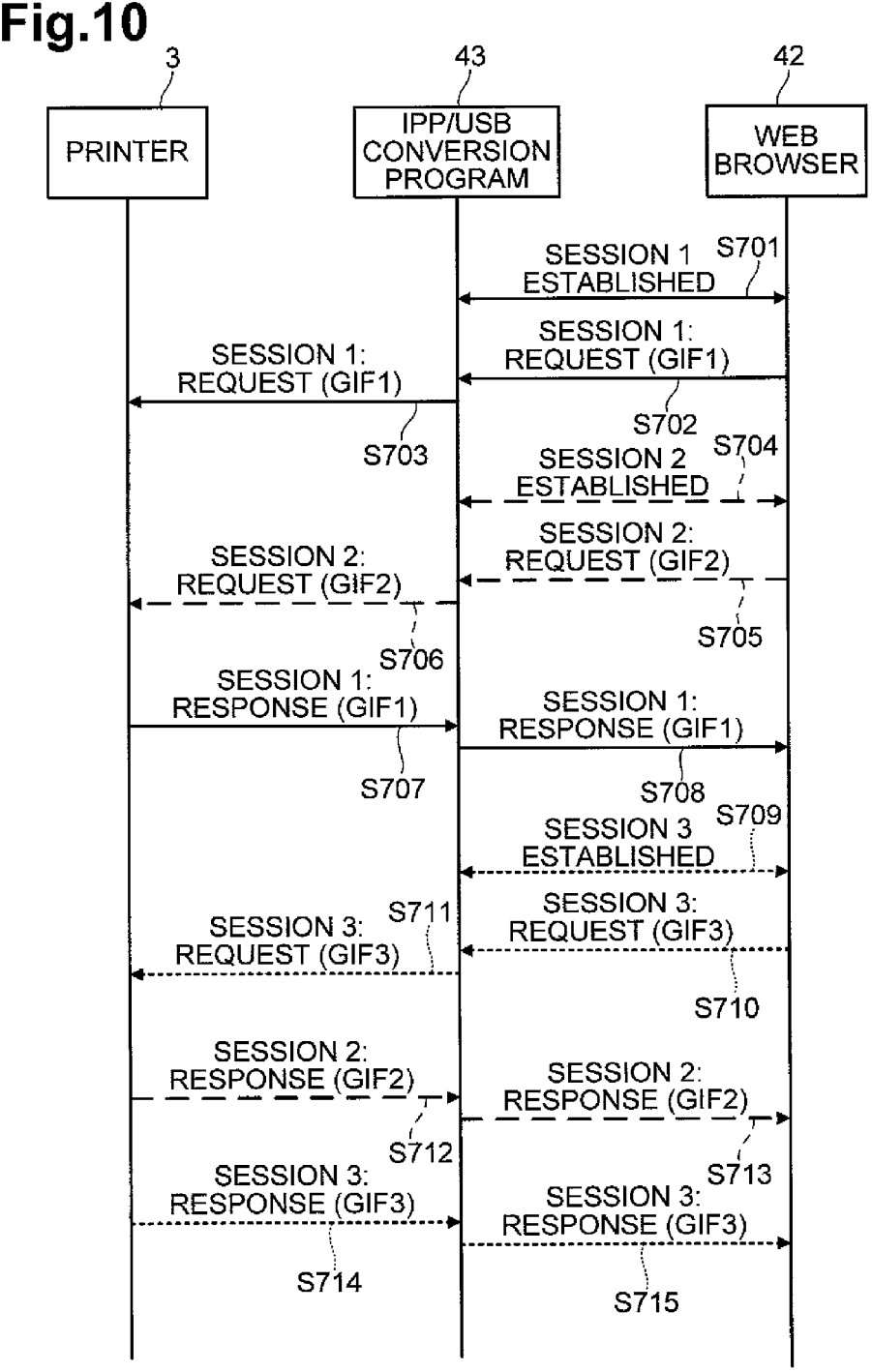
FIG. 10 is a sequence chart illustrating the overall flow of communication relay processing according to a third embodiment.

(1) Overall Flow of Communication Relay Processing Performed by IPP/USB Conversion Program First, the overall flow of communication relay processing performed by the IPP/USB conversion program 43 will be described with reference to FIG. 10. Here, the communication (a) for choosing settings for the printer 3 will be described as an example. As described above, the communication (a) for choosing settings for the printer 3 is performed using the "Interface 1".

Here, requesting of transmission of the GIF1, GIF2, and GIF3 from the IPP/USB conversion program 43 and thereafter will be described, the request being made by the web browser 42.

In addition, here, the IPP function unit 51 and the web server function unit 52 are collectively called the printer 3.

The web browser 42 first requests establishment of the session 1 from the IPP/USB conversion program 43 and the session 1 is established (step S701). The web browser 42 transmits a processing request for transmission of the GIF1, to the IPP/USB conversion program 43 through the session 1 (step S702).

Upon receiving the processing request through the session 1, the IPP/USB conversion program 43 transmits a session-ID-added processing request to the printer 3 via the USB cable 4 (step S703), the session-ID-added processing request being obtained by adding a session ID that identifies the session 1 to the received processing request.

Upon receiving the session-ID-added processing request, the printer 3 transmits the GIF1 to the IPP/USB conversion program 43 as a response to the processing request included in the session-ID-added processing request (step S707). Here, the printer 3 adds, to a response, the session ID included in the session-ID-added processing request and transmits a session-ID-added response.

Upon receiving the session-ID-added response, the IPP/USB conversion program 43 transmits a response obtained by removing the session ID from the session-ID-added response to the web browser 42 through the session identified by the session ID, that is, the session 1 (step S708).

After having requested establishment of the session 1, the web browser 42 requests establishment of the session 2 without waiting for completion of reception of the GIF 1 through the session 1 (step S704). The web browser 42 transmits a processing request for transmission of the GIF2 to the IPP/USB conversion program 43 through the session 2 (step S705). Similarly to the session 1, in the case of the session 2, communication is performed using a session ID that identifies the session 2 (steps S706, S712, and S713). Likewise, communication is performed in the case of the session 3.

By performing these series of pieces of processing, the GIF1 to GIF3 are read by the web browser 42, and the GIF1 to GIF3 are displayed on the configuration screen 60.

(2) Session-ID-Added Processing Request and Session-ID-Added Response

A piece of partial processing request data is divided in this processing as follows.

(a) a header
  (b) a block of additional data collectively specified by Content-Length (c) each of a plurality of blocks of data into which additional data is divided and which are specified in accordance with "chunked" specification Here, a header indicates data other than additional data in a processing request. In the case where no additional data is included, a header corresponds to the entirety of a processing request. In an actual request, the data of a processing request is constituted by only (a), (a) and (b), or (a) and a single or a plurality of (c).

In the case where additional data is added, one of Content-Length and chunked is specified in a header.

For example, upon receiving the header of a processing request through the session 1, the IPP/USB conversion program 43 according to the third embodiment adds the session ID of the session 1 to the header of the processing request and transmits a session-ID-added header to the IPP function unit 51.

Then, upon receiving a header through the session 2 before completion of reception of the processing request through the session 1, the IPP/USB conversion program 43 adds the session ID of the session 2 to the header received through the session 2 and transmits a session-ID-added header to the IPP function unit 51. From then on, likewise, every time the IPP/USB conversion program 43 receives a piece of partial processing request data through a session, the IPP/USB conversion program 43 adds the session ID of the session, through which the piece of partial processing request data has been received, to the piece of partial processing request data, and transmits a session-ID-added partial processing request data to the IPP function unit 51.

Likewise, the IPP function unit 51 separates a response into two pieces of partial response data, which are a header and additional data. The IPP function unit 51 adds a session ID to each piece of partial response data and transmits a session-ID-added partial response data to the IPP/USB conversion program 43.

(3) Communication Relay Processing Performed by IPP/USB Conversion Program (3-1) Thread Generation Processing Thread generation processing according to the third embodiment is substantially the same as the thread generation processing according to the first embodiment, and thus, description thereof will be omitted.

(3-2) Processing for Receiving Processing Request from Web Browser

First, processing in which the IPP/USB conversion program 43 according to the third embodiment receives a processing request from the web browser 42 will be described with reference to FIG. 11. This processing is executed by the thread generated in step S104.

In step S801, the thread executes acceptance processing. Step S801 is an example of third establishment processing.

In step S802, the thread generates a session ID that identifies a socket generated in step S801. Step S802 is an example of identifier generation processing.

In step S803, the thread stores, in the storage unit 25, socket information that identifies the socket generated in step S801 and the session ID generated in step S802 in association with each other. Step S803 is an example of first storage processing. Here, socket information is an example of identification information that identifies a session.

In step S804, the thread receives a header of a processing request from the web browser 42 through the session established in step S801. Step S804 is an example of third request reception processing.

In step S805, the thread determines whether or not notification of termination of communication has been received from the web browser 42. As described above, whether or not notification of termination of communication has been received is determined on the basis of whether or not the web browser 42 has closed the session. When it is determined that notification of termination of communication has not been received, the procedure proceeds to step S806. When it is determined that notification of termination of communication has been received, the thread finishes this processing illustrated in FIG. 11. Step S805 is an example of third termination determination processing.

In step S806, the thread executes exclusion-processing startup processing for the "Interface 1".

In step S807, the thread transmits the session ID generated in step S802 to the IPP function unit 51 through the "Interface 1".

In step S808, the thread transmits the header received in step S804 to the IPP function unit 51 through the "Interface 1". Here, in the case where the header of a processing request includes a plurality of pieces of communication data, the plurality of pieces of communication data are transmitted to the IPP function unit 51 in step S808.

The above-described steps S807 and S808 are an example of third request transmission processing in which a session-information-added processing request is transmitted to an image processing apparatus.

In step S809, the thread finishes the exclusion processing for the "Interface 1".

In step S810, the thread determines whether or not there is additional data. Specifically, in the case where the header received in step S804 includes Content-Length or chunked, the thread determines that there is additional data. In the case where neither Content-Length nor chunked is included, the thread determines that there is no additional data. In the case where there is additional data, the procedure proceeds to step S811. In the case where there is no additional data, the thread finishes this processing illustrated in FIG. 11.

In step S811, the thread executes additional-data transmission processing. Additional-data transmission processing is processing in which additional data is received from the web browser 42 and is transmitted to the IPP function unit 51.

(3-3) Additional-Data Transmission Processing

Next, additional-data transmission processing executed in step S811 will be described with reference to FIGS. 12 and 13.

In step S901, the thread determines whether or not the received header includes Content-Length. When it is determined that Content-Length is included, the procedure proceeds to step S902. When it is determined that Content-Length is not included (that is, when it is determined that chunked is included), the procedure proceeds to step S909.

In step S902, the thread obtains size-information data from the header received in step S804.

In step S903, the thread receives additional data from the web browser 42, the data size of the additional data being specified by the size-information data obtained in step S902.

In step S904, the thread determines whether or not notification of termination of communication has been received from the web browser 42 while the above-described step S903 is being executed. When it is determined that notification of termination of communication has not been received, the procedure proceeds to step S905. When it is determined that such notification has been received, the procedure proceeds to step S917.

In step S905, the thread executes exclusion-processing startup processing for the "Interface 1".

In step S906, the thread transmits the session ID generated in step S802 to the IPP function unit 51 through the "Interface 1".

In step S907, the thread transmits the additional data received in step S903 to the IPP function unit 51 through the "Interface 1".

In step S908, the thread executes exclusion-processing termination processing for the "Interface 1".

In step S909, the thread obtains size-information data of one of data blocks. Specifically, in the case where it is determined that additional data is transmitted in accordance with Chunked in the above-described step S901, processing in step S909 is performed. In this case, the additional data is normally divided into a plurality of data blocks and, for each data block, information on the number of pieces of data of the data block is added to the data block. In step S909, the size-information data of one of the data blocks is obtained.

In step S910, the thread receives a piece of partial additional data, the data size of which is specified by the size-information data obtained in step S909, from the web browser 42.

In step S911, the thread determines whether or not notification of termination of communication has been received from the web browser 42 during processing performed in a loop from the above-described step S909 to step S916. When it is determined that notification of termination of communication has not been received, the procedure proceeds to step S912. When it is determined that such notification has been received, the procedure proceeds to step S917.

In step S912, the thread executes exclusion-processing startup processing for the "Interface 1".

In step S913, the thread transmits the session ID generated in step S802 to the IPP function unit 51 through the "Interface 1".

In step S914, the thread transmits the piece of partial additional data received in step S910 to the IPP function unit 51 through the "Interface 1".

In step S915, the thread executes exclusion-processing termination processing for the "Interface 1".

In step S916, the thread determines whether or not reception of the additional data has been completed. Specifically, it is determined whether or not there is a data block subsequent to the received additional data in a method similar to that in step S204. When it is determined that reception of additional data has been completed, the thread finishes this processing illustrated in FIG. 12 and the procedure returns to processing in FIG. 11. When it is determined that reception of additional data has not yet been completed, the procedure returns to step S909 and processing in and after step S909 is repeated. Note that, even when this processing illustrated in FIG. 12 is finished, the session continues existing.

In step S917, the thread generates a termination notification with a session ID, the session ID being the session ID generated in step S802. Hereinafter such a termination notification with a session ID is referred to as a session-ID-added termination notification.

In step S918, the thread transmits the session-ID-added termination notification generated in step S917 to the IPP function unit 51 by performing control transfer. As described above, control transfer is performed using the interface 0. Step S918 is an example of second termination notification processing.

In step S919, the thread deletes, from the storage unit 25, the session ID generated in step S802 and the socket information stored in association with the session ID.

Figure 11:
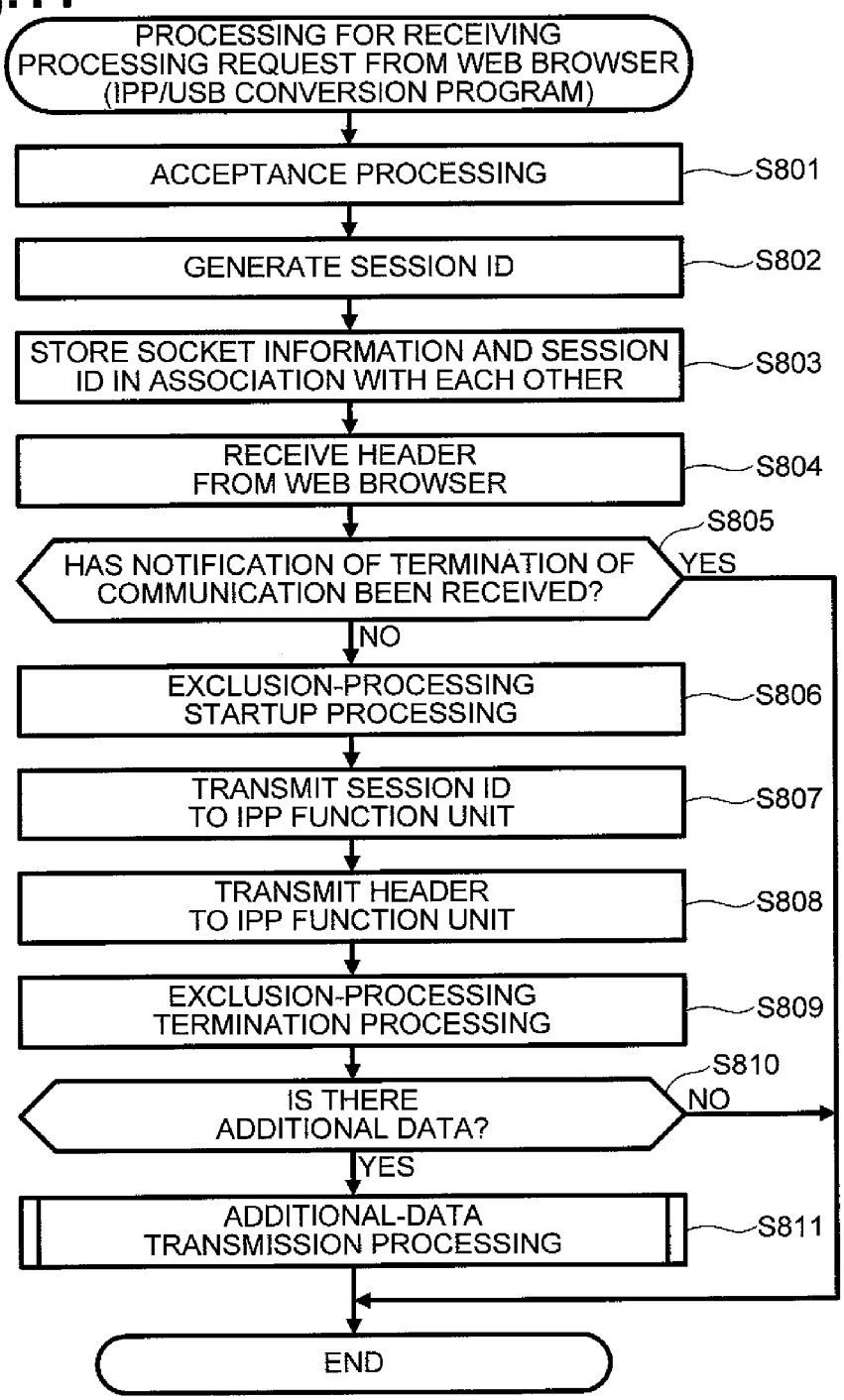
FIG. 11 is a flowchart of processing for receiving a processing request from a web browser.
Figure 12:
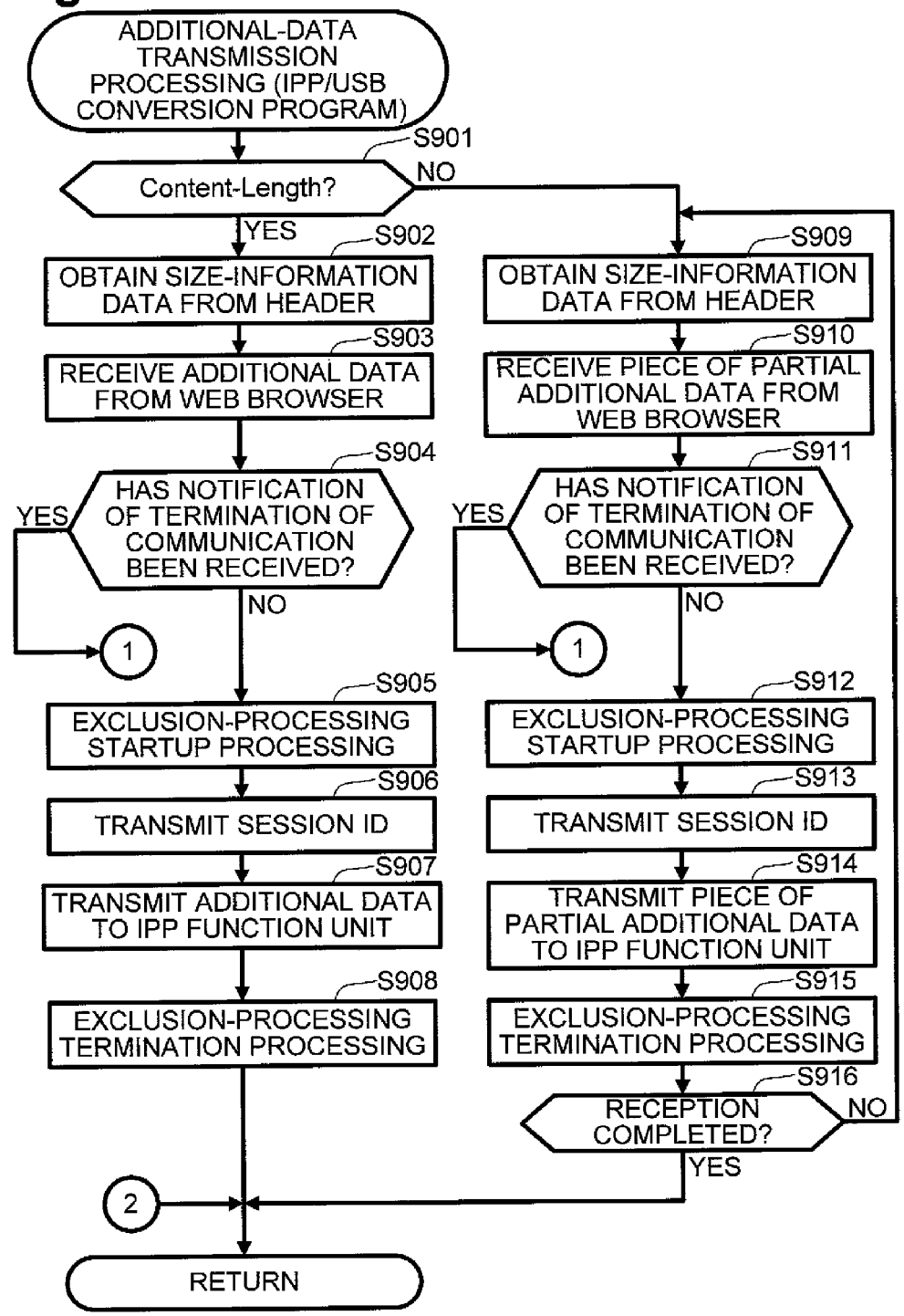
FIG. 12 is a flowchart of additional-data transmission processing (part 1).
Figure 13:
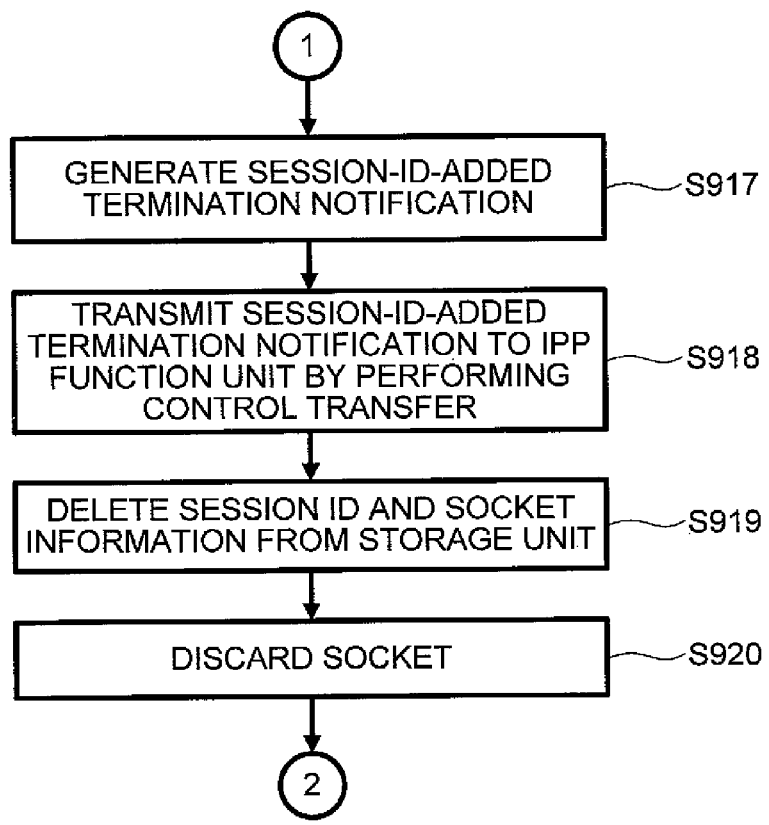
FIG. 13 is a flowchart of additional-data transmission processing (part 2).

In step S920, the thread discards the socket and the procedure returns to processing in FIG. 12 and then to processing in FIG. 11.

(3-4) Processing for Receiving Response from IPP Function Unit

Figure 14:
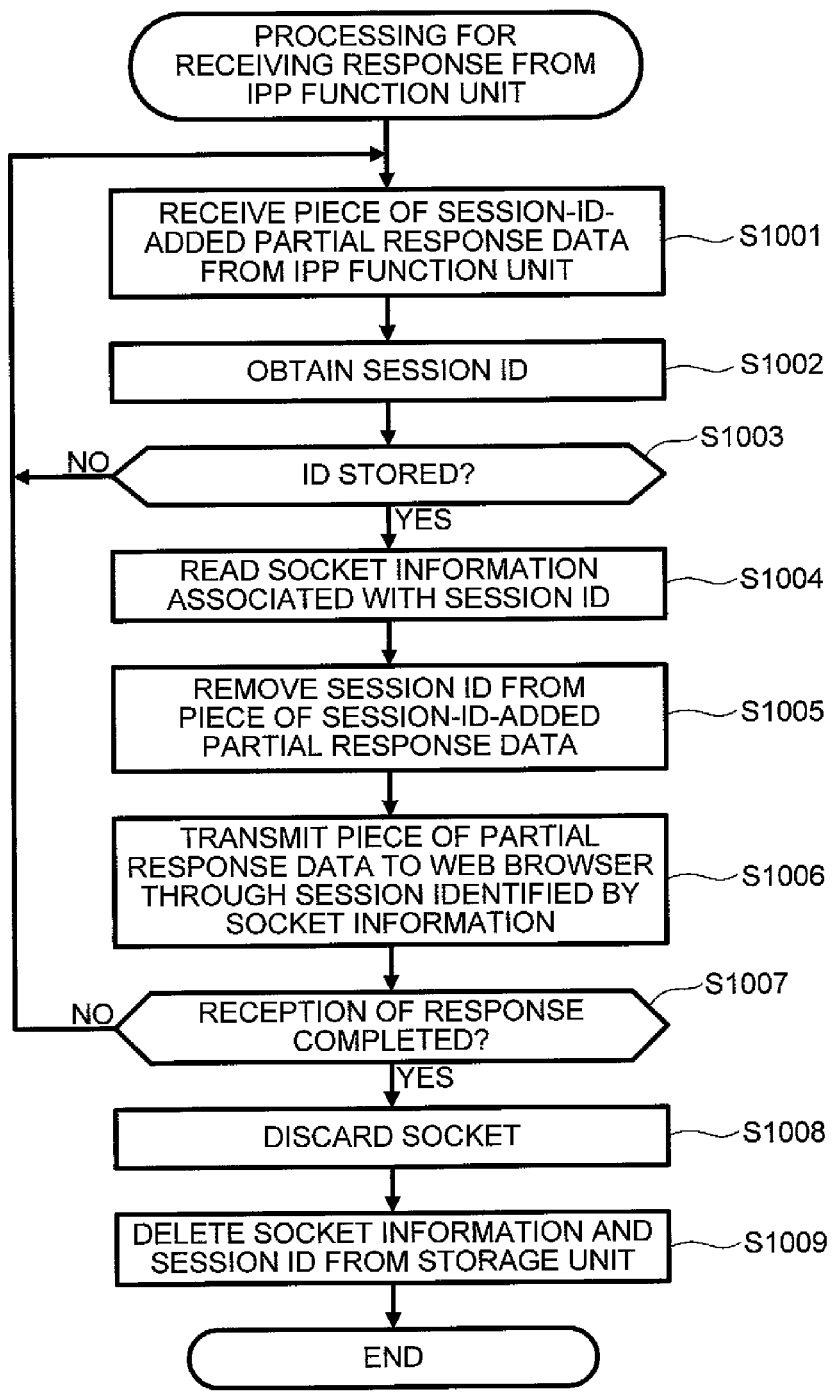
FIG. 14 is a flowchart of processing for receiving a response from an IPP function unit.

Next, processing in which the IPP/USB conversion program 43 receives a response from the IPP function unit 51 will be described with reference to FIG. 14.

In step S1001, the IPP/USB conversion program 43 receives a piece of partial response data with a session ID, hereinafter referred to as a piece of session-ID-added partial response data, from the IPP function unit 51. Step S1001 is an example of first response reception processing.

In step S1002, the IPP/USB conversion program 43 obtains the session ID from the piece of session-ID-added partial response data.

In step S1003, the IPP/USB conversion program 43 determines whether or not the session ID obtained in step S1002 is stored in the storage unit 25. When it is determined that the session ID is stored, the procedure proceeds to step S1004. In contrast, when it is determined that the session ID is not stored, the IPP/USB conversion program 43 discards the piece of session-ID-added partial response data received in step S1001 and the procedure returns to step S1001.

In step S1004, the IPP/USB conversion program 43 reads, from the storage unit 25, socket information stored in association with a session ID that is identical to the session ID obtained in step S1002. This socket information is information stored in the above-described step S803.

In step S1005, the IPP/USB conversion program 43 removes the session ID from the piece of session-ID-added partial response data received in the step S1001.

In step S1006, the IPP/USB conversion program 43 transmits the piece of partial response data obtained in step S1005 by removing the session ID from the piece of session-ID-added partial response data, to the web browser 42 through a session identified by the socket information read in step S1004. Step S1006 is an example of first response transmission processing.

In step S1007, the IPP/USB conversion program 43 determines whether or not reception of a response from the IPP function unit 51 has been completed. This determination is performed in a procedure similar to step S208. When it is determined that reception of a response has not been completed, the procedure returns to step S1001 and processing in and after step S1001 is repeated. When it is determined that reception of a response has been completed, the procedure proceeds to step S1008.

In step S1008, the IPP/USB conversion program 43 discards a socket identified by the socket information read in step S1004.

In step S1009, the IPP/USB conversion program 43 deletes the session ID obtained in step S1002 and the socket information associated with the session ID from the storage unit 25. Step S1009 is an example of deletion processing.

(4) Processing Performed by IPP Function Unit

Next, processing in which the IPP function unit 51 receives a processing request from the IPP/USB conversion program 43 and processing in which the IPP function unit 51 receives a response from the web server function unit 52 will be described.

(4-1) Processing for Receiving Processing Request from IPP/USB Conversion Program First, processing in which the IPP function unit 51 receives a processing request from the IPP/USB conversion program 43 will be described with reference to FIG. 15.

In step S1101, the IPP function unit 51 receives a piece of partial processing request data (a header or additional data) with a session ID, hereinafter referred to as a piece of session-ID-added partial processing request data, from the IPP/USB conversion program 43 via the USB cable 4.

Here, step S1101 does not wait until a piece of session-ID-added partial processing request data is received from the IPP/USB conversion program 43. In the case where a piece of session-ID-added partial processing request data is not received, the data size of received data is set to 0 and the procedure proceeds to step S1102.

In step S1102, the IPP function unit 51 determines whether or not the IPP function unit 51 is notified of termination of communication by termination processing, which will be described later. Although details will be described later, the session-ID-added termination notification transmitted from the IPP/USB conversion program 43 in the above-described step S918 is received by the termination processing, which will be described later. Upon receiving the session-ID-added termination notification, the termination processing, which will be described later, notifies the IPP function unit 51 of the session ID. The IPP function unit 51 may determine whether or not the IPP function unit 51 is notified of termination of communication on the basis of whether or not the IPP function unit 51 is notified of a session ID by the termination processing. When it is determined that the IPP function unit 51 is notified of the termination of communication, the procedure proceeds to step S1103. When it is determined that the IPP function unit 51 is not notified of termination of communication, the procedure proceeds to step S1105.

In step S1103, the IPP function unit 51 determines whether or not the session ID included in the piece of session-ID-added partial processing request data received in step S1101 matches the session ID of which the IPP function unit 51 has been notified by the termination processing. When it is determined that these session IDs match, the procedure proceeds to step S1104. When it is determined that these session IDs do not match, the procedure proceeds to step S1105.

In step S1104, the IPP function unit 51 discards the piece of session-ID-added partial processing request data received in step S1101 and the procedure returns to step S1101.

In step S1105, the IPP function unit 51 determines whether or not the data size of data received in step S1101 is 0 (zero). When it is determined that the data size is 0, the procedure returns to step S1101. When it is determined that the data size is not 0, the procedure proceeds to step S1106.

In step S1106, the IPP function unit 51 obtains the session ID from the piece of session-ID-added partial processing request data received in step S1101.

In step S1107, the IPP function unit 51 determines whether or not the session ID obtained in step S1106 is stored in the storage unit 35 in association with socket information that identifies a session established between the IPP function unit 51 and the web server function unit 52. Specifically, this processing illustrated in FIG. 15 is processing performed in a loop. There may be a case where step S1107 is executed after execution of step S1109, which will be described later. In such a case, there may be a case where the session ID obtained in step S1106 has already been stored in the storage unit 35. When it is determined that the session ID obtained in step S1106 is not stored, the procedure proceeds to step S1108. When it is determined that the session ID obtained in step S1106 is stored, the procedure proceeds to step S1110. Step S1107 is an example of storage determination processing. Moreover, socket information is an example of communication identification information.

In step S1108, the IPP function unit 51 generates a socket used to perform communication with the web server function unit 52 and establishes a new session between the IPP function unit 51 and the web server function unit 52 through the generated socket. The session established between the IPP function unit 51 and the web server function unit 52 is an example of communication. Hereinafter, a session established between the IPP function unit 51 and the web server function unit 52 is referred to as communication. Step S1108 is an example of fifth establishment processing.

In step S1109, the IPP function unit 51 stores, in the storage unit 35, the session ID obtained in step S1106 and socket information that identifies the socket generated in step S1108 in association with each other. Step S1109 is an example of second storage processing.

In step S1110, the IPP function unit 51 reads, from the storage unit 35, socket information associated with a session ID that is identical to the session ID obtained in step S1106.

In step S1111, the IPP function unit 51 removes the session ID from the piece of session-ID-added partial processing request data received in step S1101.

In step S1112, the IPP function unit 51 transmits the piece of partial processing request data obtained in step S1111 by removing the session ID from the piece of session-ID-added partial processing request data, to the web server function unit 52 through the socket generated in step S1108 or the socket identified by the socket information read in step S1110. Step S1112 is an example of fifth request transmission processing.

In step S1113, the IPP function unit 51 determines whether or not reception of the processing request has been completed. This determination may be performed similarly to the above-described step S204. When it is determined that reception of the processing request has been completed, the procedure proceeds to step S1114. When it is determined that reception of the processing request has not been completed, the procedure returns to step S1101 and processing in and after step S1101 is repeated.

In step S1114, the IPP function unit 51 generates a thread. This thread is a thread used to receive a response from the web server function unit 52 and to perform transmission to the IPP/USB conversion program 43.

(4-2) Termination Processing

Next, termination processing mentioned earlier will be described with reference to FIG. 16. This processing is started when the IPP function unit 51 receives a session-ID-added termination notification transmitted from the IPP/USB conversion program 43 through the interface 0 in the above-described step S918.

In step S1201, the IPP function unit 51 obtains the session ID from the session-ID-added termination notification transmitted by performing "control transfer", which is known as a transfer method in USB protocol, from the IPP/USB conversion program 43. Step S1201 is an example of fifth termination determination processing and an example of sixth termination determination processing.

Figure 15:
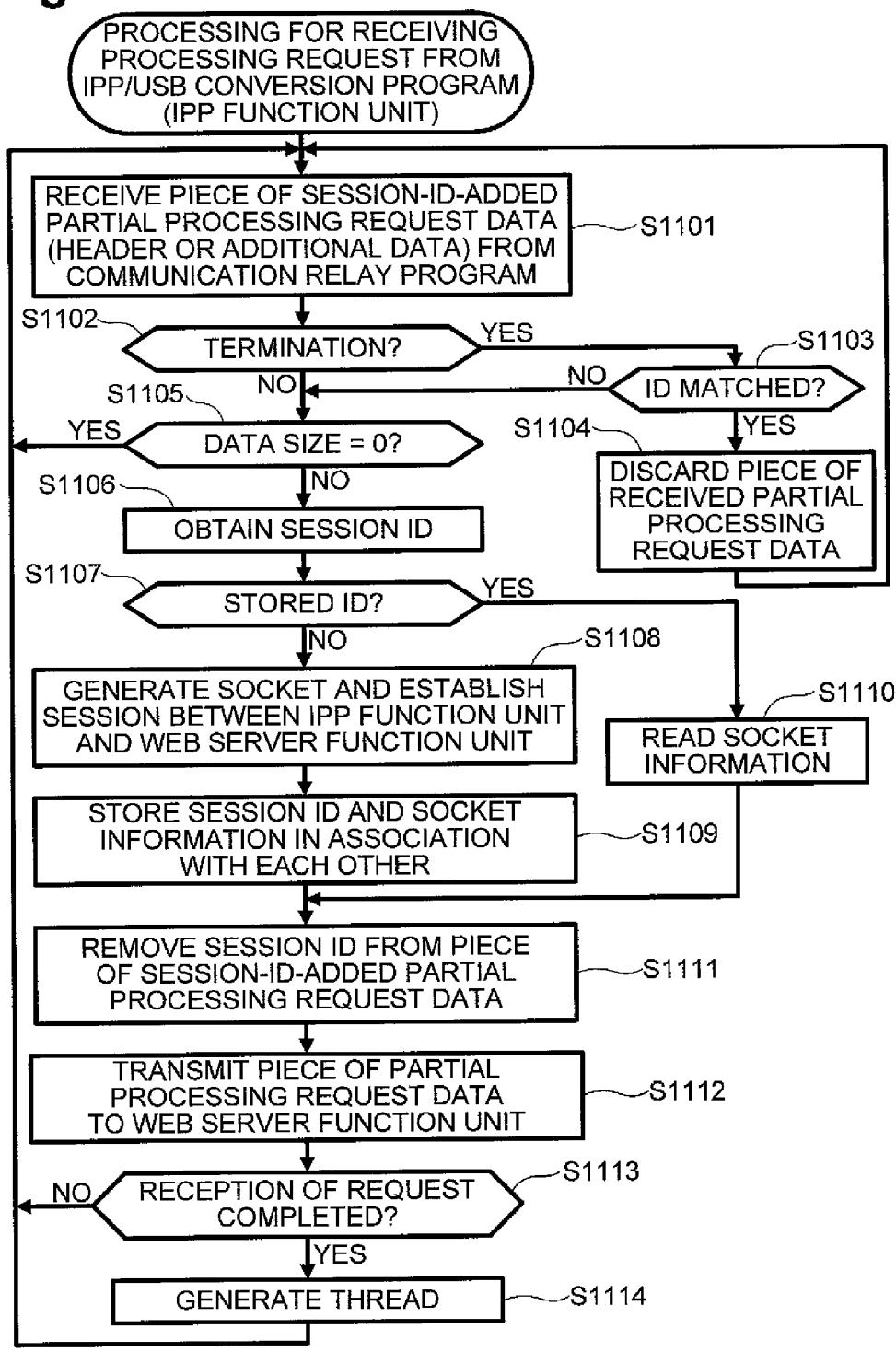
FIG. 15 is a flowchart of processing for receiving a processing request from an IPP/USB conversion program.
Figure 16:
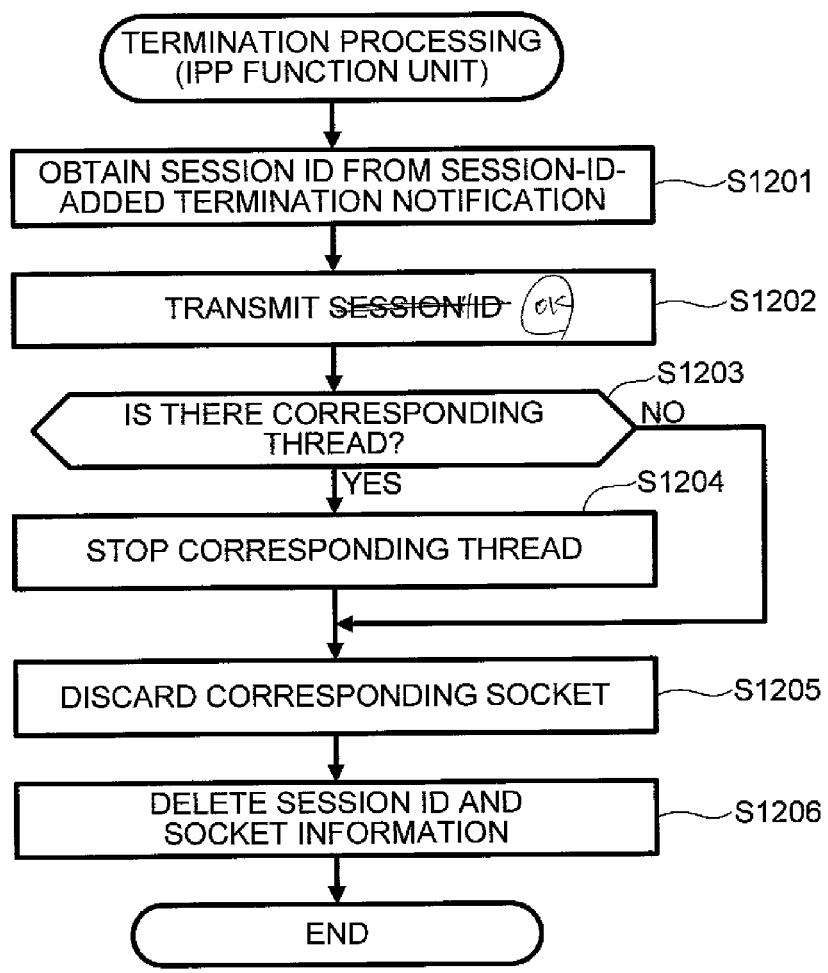
FIG. 16 is a flowchart of termination processing.

In step S1202, the IPP function unit 51 notifies the above-described "processing for receiving a processing request from the IPP/USB conversion program", shown in FIG. 15, of the session ID included in the session-ID-added termination notification. When the above-described "processing for receiving a processing request from the IPP/USB conversion program" is notified of this session ID, YES is obtained in the above-described step S1102. Moreover, the session ID, of which the above-described "processing for receiving a processing request from the IPP/USB conversion program" is notified, is used to perform determination in the above-described step S1103.

In step S1203, the IPP function unit 51 determines whether or not there is a thread corresponding to the session ID obtained in step S1201. When it is determined that there is such a thread, the procedure proceeds to step S1204. When it is determined that there is not such a thread, the procedure proceeds to step S1205.

In step S1204, the IPP function unit 51 stops the thread corresponding to the session ID obtained in step S1201 from among threads generated in step S1114.

In step S1205, the IPP function unit 51 closes the socket identified by socket information corresponding to the session ID obtained in step S1201. Step S1205 is an example of second finishing processing and an example of third finishing processing.

In step S1206, the IPP function unit 51 deletes, from the storage unit 35, the session ID obtained in step S1201 and the socket information stored in association with the session ID.

(4-3) Processing for Receiving Response from Web Server Function Unit

Figure 17:
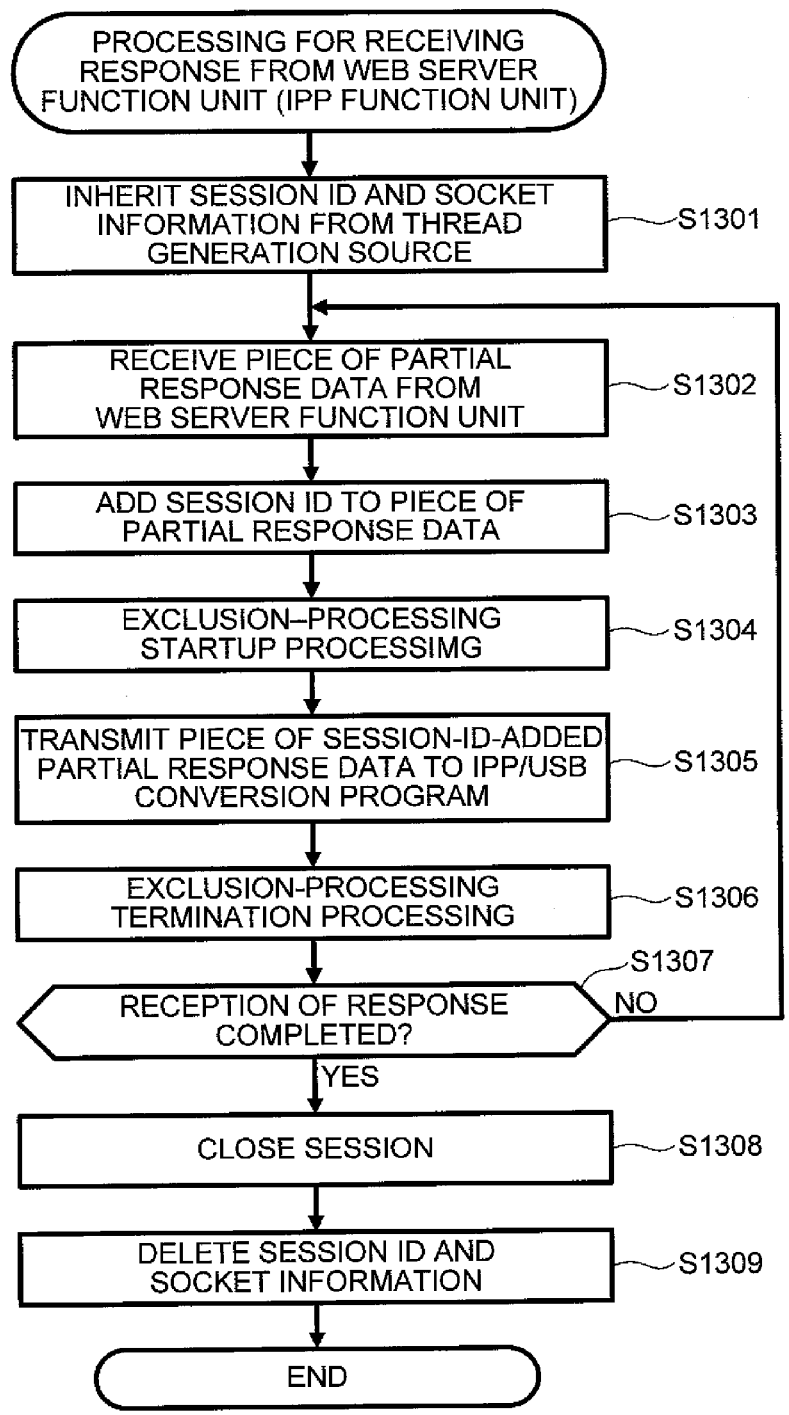
FIG. 17 is a flowchart of processing for receiving a response from a web server function unit.

Next, processing in which the IPP function unit 51 receives a response from the web server function unit 52 will be described with reference to FIG. 17. This processing is executed by the thread generated in the above-described step S1114. Note that there may be a case where this thread is stopped in the above-described step S1204.

In step S1301, the thread inherits the session ID obtained in step S1106 and also inherits socket information on the socket generated in step S1108 or the socket information read in step S1110.

In step S1302, the thread receives a piece of partial response data from the web server function unit 52. Step S1302 is an example of third response reception processing.

In step S1303, the thread adds the session ID to the piece of partial response data received in step S1302.

In step S1304, the thread executes exclusion-processing startup processing for the "Interface 1". Specifically, the thread obtains a Mutex of the "Interface 1". Note that, the Mutex obtained here is different from the Mutex generated in step S101. The Mutex obtained here is, for example, a Mutex generated in initial processing executed when the printer 3 is turned on.

In step S1305, the thread transmits a piece of session-ID-added partial response data to the IPP/USB conversion program 43, the piece of session-ID-added partial response data being obtained in step S1303. Step S1305 is an example of third response transmission processing.

In step S1306, the thread finishes the exclusion processing for the "Interface 1".

In step S1307, it is determined whether or not all responses regarding the session have been received from the web browser 42. As a result, when it is determined that YES is obtained, the procedure proceeds to step S1308. When it is determined that NO is obtained, the procedure returns to step S1302 and the remainder of data is received. This determination as to whether reception has been completed may be performed similarly to the above-described step S204.

In step S1308, the thread closes the session.

In step S1309, the thread deletes, from the storage unit 35, the session ID and the socket information obtained in step S1301.

(5) Effects of Third Embodiment

In the case where communication between the printer 3 and the web browser 42 is lost in the middle of communication, the above-described IPP/USB conversion program 43 according to the third embodiment issues a termination notification. Thus, the printer 3 may be prevented, in units of a session, from remaining in a reception waiting state for a long period of time.

Furthermore, in the case where the IPP/USB conversion program 43 is used, stored session identifiers and stored identification information that are no longer needed may be prevented from remaining in the storage unit 25.

Furthermore, in the case where a session identifier, which is included as session information in a session-information-added response, is not stored in the storage unit 25, the IPP/USB conversion program 43 does not transmit a response to the web browser 42. Thus, transmission of unnecessary responses to the web browser 42 may be prevented.

Moreover, in the case where the printer 3 according to the third embodiment is used and in the case where communication between the IPP function unit 51 and the web server function unit 52 is lost while multi-session communication is remaining performed, the IPP function unit 51 notifies the web server function unit 52 of termination of communication. Thus, the web server function unit 52 may be prevented from remaining in a reception waiting state for a long period of time.

Furthermore, in the case where the printer 3 is used and in the case where the IPP function unit 51 is notified of termination of communication by the PC 2 while receiving a response from the web server function unit 52, the web server function unit 52 may be prevented from remaining in a transmission waiting state for a long period of time.

OTHER EMBODIMENTS

Embodiments are not limited to the above-described embodiments described with reference to the drawings. For example, the following embodiments also fall within the technical scope of the technologies disclosed in the present application.

(1) In the above-described first and second embodiments, a client application that performs multi-session communication has been described as an example. In contrast, a client application that performs single-session communication may also be used.

(2) In the above-described third embodiment, a case where a session ID is added as session information to a processing request has been described as an example. In contrast, socket information may be added instead of a session ID.

(3) In the above-described third embodiment, as an example in which a processing request is divided into a plurality of pieces of partial processing request data, a case where a processing request is divided into a header and additional data has been described as an example. However, a standard on which a processing request is divided into a plurality of pieces of partial processing request data is not limited this, and a processing request may be divided on an arbitrary standard.

(4) In the above-described embodiments, a USB cable is described as an example of a communication line. However, communication lines are not limited to USB cables. For example, the PC 2 and the printer 3 may communicate with each other in accordance with IEEE 1284, which is a communication standard for the printer 3.

(5) In the above-described embodiments, an example in which a new thread is generated every time establishment of a session is requested has been described. In contrast, without generating threads, processing for sessions may be executed in a sequential manner in communication relay processing. Alternatively, processes are generated instead of threads and processing, which is performed by threads in the above-described embodiments, may be performed by the processes.

(6) In the above-described embodiments, an example in which the PC 2 is connected to the printer 3 with a plurality of logical communication lines has been described. In contrast, the PC 2 may be connected to the printer 3 with a plurality of physical communication lines.

(7) In the above-described embodiments, in a case where communication for choosing settings for the printer 3 is performed using multiple sessions, a case where exclusive control is performed for sessions has been described as an example. In addition to this, in a case where communication for transmitting print data to the printer 3 is performed using multiple sessions, exclusive control may be performed for sessions.

(8) In the above-described embodiments, reception from the web browser 42 is performed after the exclusion processing has been started. That is, before execution of reception of a request is allowed by performing the exclusion processing, a request from the web browser 42 is not received. However, it is desirable that the exclusion processing be started before transmission of data from the web browser 42 to the printer 3 (the IPP function unit 51 or the web server function unit 52) and the exclusion processing may start after reception of a request from the web browser 42.

(9) In the above-described embodiments, the printer 3 is described as an example of an image processing apparatus. However, the image processing apparatus may be what is called a multifunction printer, which has a printer function, a scanner function, a copier function, a facsimile function, and the like.

(10) In the above-described embodiments, the CPU 31a is described as an example of a processing unit. However, a processing unit may be constituted by two or more CPUs, may be constituted by an ASIC, or may be constituted by a combination of a CPU and an ASIC.

(11) In all of the above-described embodiments, a printer is constituted so as not to request a plurality of pieces of processing request data through a single session in accordance with a Keep-Alive specification. However, the Keep-Alive specification may be met by using a socket even after completion of transmission of a response without discarding the socket.

Note that, the technologies disclosed in the present application may be realized in various examples such as an image processing system, a communication relay apparatus, a communication relay method, a recording medium on which a communication relay program is recorded, and the like.

What is claimed is:

1. A non-transitory computer-readable medium storing a communication relay program including instructions that, when executed by a processor, cause an information processing apparatus connected to an image processing apparatus via a communication interface to:
  receive a processing request from a client application, wherein the client application performs multi-session communication;
  in response to a request for establishment of a session by the client application, establish a session between the communication relay program and the client application, the established session being a first session;
  after the first session has been established, determine whether communication through the first session is prohibited;
  wait to communicate through the first session in a case where the communication through the first session is prohibited, until communication through the first session is permitted;
  perform an exclusive communication process during the first session in which communication through a second session other than the first session is prohibited in a case where the communication through the first session is permitted;
  determine whether a notification of termination of communication has been received from the client application while the processing request is being received from the client application;
  in a case where reception of the processing request from the client application is completed without receiving the notification of termination of communication from the client application, transmit the processing request received from the client application to the image processing apparatus through the first session in a state in which communication through the second session other than the first session is prohibited;
  in a case where communication between the client application and the image processing apparatus through the first session is completed without receiving the notification of termination of communication from the client application, permit communication through the second session other than the first session; and
  in a case where the notification of termination of communication has been received from the client application while the processing request is being received from the client application for the first session, cancel transmission of the processing request received from the client application to the image processing apparatus for the first session and permit communication through the second session other than the first session.

2. The non-transitory computer-readable medium according to claim 1,
  wherein the communication interface is configured to connect a Universal Serial Bus cable.

3. A non-transitory computer-readable medium storing a communication relay program including instructions that, when executed by a processor, cause an information processing apparatus connected to an image processing apparatus via a communication interface to:
  receive a processing request from a client application, wherein the client application performs multi-session communication;
  in response to a request for establishment of a session by the client application, establish a session between the communication relay program and the client application, the established session being a first session;
  after the first session has been established, determine whether communication through the first session is prohibited;
  wait to communicate through the first session in a case where the communication through the first session is prohibited, until communication through the first session is permitted;
  in a case where the communication through the first session is permitted, perform an exclusive communication process during the first session in which communication through a second session other than the first session is prohibited;
  in a case in which communication through the second session other than the first session is prohibited, start transmitting the processing request received from the client application to the image processing apparatus through the first session before the reception of the processing request from the client application has been completed for the first session;

determine whether a notification of termination of communication has been received from the client application for the first session while the processing request is being received from the client application for the first session;

in a case where communication between the client application and the image processing apparatus through the first session is completed without receiving the notification of termination of communication from the client application, permit communication through the second session other than the first session; and in a case where the notification of termination of communication has been received from the client application for the first session while the processing request for the first session is being received from the client application, transmit a termination notification of communication between the client application and the image processing apparatus to the image processing apparatus for the first session and permit communication through the second session other than the first session.

4. A non-transitory computer-readable medium storing a communication relay program including instructions that, when executed by a processor, cause an information processing apparatus connected to an image processing apparatus via a communication interface to:

in response to a request for establishment of a session by a client application, the client application performing multi-session communication, establish a session between the communication relay program and the client application;

receive a process request from the client application through the established session;

add session information for identifying the established session to the process request received from the client application;

start transmitting the process request including the session information to the image processing apparatus before the reception of the processing request from the client application has been completed;

receive from the image processing apparatus a response including the session information, such that the response is a response corresponding to the process request transmitted to the image processing apparatus;

remove the session information from the response including the session information received from the image processing apparatus;

transmit the response without the session information to the client application through the session identified by the session information;

determine whether a notification of termination of communication has been received from the client application through the established session while the processing request is being received from the client application; and in a case where the notification of termination of communication has been received from the client application, transmit a termination notification of communication between the client application and the image processing apparatus to the image processing apparatus.

5. The non-transitory computer-readable medium according to claim 4, wherein the communication relay program further includes instructions that, when executed by the processor, cause the information processing apparatus to:

in a case where the session has been established between the communication relay program and the client application, generate a session identifier regarding the established session;

store the session identifier and identification information for identifying the established session in a storage device in which the session identifier and the identification information are associated with each other;

add the session identifier to the process request as the session information;

transmit the response to the client application through the session identified by the identification information associated with the session identifier added to the response received from the image processing apparatus; and in a case where the notification of termination of communication has been received from the client application through the established session while the processing request is being received from the client application, delete the session identifier for the session through which the notification of termination of communication has been received and the identification information associated with the session identifier from the storage device.

6. The non-transitory computer-readable medium according to claim 5, wherein the communication relay program further includes instructions that, when executed by the processor, cause the information processing apparatus to:

in a case where the session information included in the response received from the image processing apparatus is not stored in the storage device, cancel transmission of the response to the client application.

7. An image processing apparatus comprising:

a communication interface configured to communicate with an information processing apparatus;

a storage in which computer-readable instructions are stored; and a processing unit configured to execute the computer-readable instructions such that said processing unit operates as a protocol function unit and a data server function unit, wherein said data server function unit is configured to transmit, to the protocol function response to a processing request received from the protocol function unit, wherein the protocol function unit is configured to:

receive a processing request from the information processing apparatus through the communication interface;

in a case where the processing request is received from the information processing apparatus, establish communication between the data server function unit and the protocol function unit;

transmit the processing request received from the information processing apparatus to the data server function unit through the established communication;

receive from the data server function unit a response corresponding to the processing request;

transmit the response received from the data server function unit to the information processing apparatus through the communication interface;

determine whether a termination notification of communication has been received from the information processing apparatus while the processing request is being received from the information processing apparatus; and terminate, in a case where the termination notification of communication has been received from the information processing apparatus, the established communication between the data server function unit and the protocol function unit.

8. The image processing apparatus according to claim 7, wherein, in a case where the protocol function unit receives the termination notification of communication from the information processing apparatus after transmitting the processing request received from the information processing apparatus to the data server function unit and before transmitting the response to the information processing apparatus, the protocol function unit is further configured to cancel transmission of the response received from the data server function unit to the information processing apparatus.

9. The image processing apparatus according to claim 7, further comprising a storage device;
wherein the protocol function unit is further configured to:
in a case where the processing request including session information is received from the information processing apparatus; determine whether the session information included in the processing request is stored in the storage device in association with communication identification information that identifies communication established between the protocol function unit and the data server function unit;
establish a communication between the data server function unit and the protocol function unit in a case where the session information included in the processing request is not stored;
store the communication identification information that identifies the established communication and the session information in the storage device in association with each other;
remove the session information from the processing request including the session information received from the information processing apparatus;
transmit the response without the session information to the data server function unit through the communication identified by the session information stored in the storage device in a case where the session information is stored;
transmit the response without the session information to the data server function unit through the established communication in a case where the session information is not stored;
receive from the data server function unit a response corresponding to the process request transmitted to the data server function unit through one of the communication identified by the session information stored in the storage device and the established communication;
add session information stored in the storage device in association with the communication identification information on the communication through which the response has been received from the data server function unit;
transmit the response including the session information to the information processing apparatus;
determine whether a termination notification including the session information has been received from the information processing apparatus while the processing request is being received from the information processing apparatus; and
terminate, in a case where the notification of termination of communication including the session information has been received from the information processing apparatus, the communication identified by the communication identification information stored in the storage device in association with the session information included in the notification of termination of communication.

10. The image processing apparatus according to claim 9, wherein the protocol function unit is further configured to:
determine whether the termination notification including the session information has been received from the information processing apparatus while the response is being received from the data server function unit, and
in a case where the termination notification including the session information has been received, terminate the communication identified by the communication identification stored in the storage device in association with the session information included in the termination notification including the session information.

11. The image processing apparatus according to claim 7, wherein the communication interface is configured to connect a Universal Serial Bus cable.

* * * * *